United States Patent
Henderson et al.

(10) Patent No.: US 7,085,856 B2
(45) Date of Patent: Aug. 1, 2006

(54) METHOD AND SYSTEM FOR EVALUATING AND OPTIMIZING PLACEMENT OF PCI ADAPTERS IN A MULTI-PARTITIONED SERVER WITH RESPECT TO FUNCTION, PERFORMANCE, AND AVAILABILITY

(75) Inventors: Daniel James Henderson, Georgetown, TX (US); Michael S. Stys, Austin, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 10/464,888

(22) Filed: Jun. 19, 2003

(65) Prior Publication Data
US 2004/0260857 A1    Dec. 23, 2004

(51) Int. Cl.
*G06F 3/00* (2006.01)
*G06F 13/00* (2006.01)
(52) U.S. Cl. .............................. 710/8; 710/10; 709/220
(58) Field of Classification Search ................... 710/47, 710/33–52, 57, 58, 100, 107, 109, 113, 154, 710/305, 323; 709/220, 226
See application file for complete search history.

(56) References Cited

U.S. PATENT DOCUMENTS

| | | | | |
|---|---|---|---|---|
| 5,179,670 A | * | 1/1993 | Farmwald et al. | 710/104 |
| 5,619,701 A | * | 4/1997 | Neti | 718/104 |
| 5,745,765 A | * | 4/1998 | Paseman | 717/107 |
| 5,787,246 A | * | 7/1998 | Lichtman et al. | 709/220 |
| 6,119,185 A | * | 9/2000 | Westerinen et al. | 710/104 |
| 6,263,382 B1 | * | 7/2001 | Bartlett et al. | 709/220 |
| 6,754,747 B1 | * | 6/2004 | Locklear et al. | 710/100 |

* cited by examiner

*Primary Examiner*—Khanh Dang
(74) *Attorney, Agent, or Firm*—Duke W. Yee; Mark E. McBurney; Brian D. Owens

(57) ABSTRACT

A means and system of describing rules for performance and availability for a system with respect to individual adapter cards and I/O drawers. It describes a means of scoring system configurations by how well they conform to the defined rules. It also describes a means of scoring the relative value of the placement of individual cards and I/O slots. It then defines a means of placing I/O cards into I/O slots for a defined number of I/O drawers following the rules and achieving the best individual scores for cards and slots. It also optimizes the placement to achieve the best possible system score.

16 Claims, 16 Drawing Sheets

METHOD AND SYSTEM FOR EVALUATING AND OPTIMIZING PLACEMENT OF PCI ADAPTERS IN A MULTI-PARTITIONED SERVER WITH RESPECT TO FUNCTION, PERFORMANCE, AND AVAILABILITY

BACKGROUND OF THE INVENTION

1. Technical Field

The present invention is generally related to logical partitions and access to devices, and more particularly to optimizing performance and availability of devices in partitioned systems.

2. Description of Related Art

A desirable attribute of a server is the ability to run multiple operating system images simultaneously on the hardware in autonomous partitions. In such an environment, each partition defined for the system owns some subpartition of all the available system resources such as processors, memory and I/O cards.

Hard Partitioning

One way to accomplish this partitioning is to design a system as a collection of electrically isolated SMP modules. Each individual SMP module would have the ability to run a separate instance of an operating system. Each SMP module running an operating system would be known as a partition. In addition SMP modules could be aggregated together to create larger partitions. This kind of partition is usually known as hard partitioning.

In a hard-partitioned server, certain resources of the system might be shared among all the partitions (e.g. power and cooling) while the rest would operate independently. A key feature of this environment is that a failure of a non-shared resource would generally only impact one partition.

On the other hand, if hardware partitioning is accomplished by aggregating one or more SMP modules in a system, and each module has, for example, 4 processors, then a hard partition can contain only 4, 8, 12 or some other multiple of 4 processors. The granularity doesn't exist to create a 5 or 10 processor partition. Other elements such as memory and possibly I/O are likewise limited.

FIG. 1 illustrates some hard partitioning possibilities of a hypothetical system where the minimum partition granularity is four processors with 4 memory cards and one I/O drawer. In the illustration, "p" stands for a processor, "m" stands for a unit of memory and "i" stands for an I/O card.

Logical Partitioning

Another approach to partitioning, such as found on pSeries servers from IBM, is known as "logical partitioning." In this method, a firmware layer called a hypervisor runs beneath the operating systems. The hypervisor controls all of the system resources, and can allocate them to individual partitions without the hardware limitations of physical partitioning. FIG. 2 below gives an illustration of this.

This approach allows the assignment of single processors, memory elements and I/O cards to individual partitions. By design it is much more flexible than the physical partitioning approach.

While not being limited to it, it should be noted that this approach, to a large degree, still permits logical partitions to be defined along physical boundaries to take advantage of the availability characteristics that electrical isolation of the physical boundaries afford.

Software Partitioning

An additional approach to partitioning is a concept known as "software partitioning" or "virtual partitioning." In this approach, software running in an existing hard partition can be used to host separate virtual partitions each running their own separate image of the operating system. This approach, with some additional overhead, allows for greater granularity of partitions within a hard partition. However, the availability characteristics of the soft partition from a hardware standpoint are generally limited to the availability characteristics of the hard partition. In other words, a fatal hardware error anywhere with the hard partition will cause all of the software partitions under it to fail.

Hardware Availability Considerations with Logical Partitioning

As in the physical partitioning case, it is still generally true that resources shared by more than one partition can cause all the partitions sharing the resource to be compromised if a hardware failure occurs.

For a large number of components in a system, logical partitioning allows for a choice of how much hardware is shared. Understanding the implications of the options available is important in deciding how partitioning should be accomplished.

This illustration of FIG. 3 shows a CEC containing a number of processors being attached to an I/O drawer which contains two I/O planars. Each I/O planar effectively has 12 Slots.

Each group of 4 slots in a planar connects through a PCI-PCI bridge, to a function called a PHB. All the PHBs in turn are connected to the CEC by what is labeled a "Hub Port."

Because each I/O card has a separate path to the PCI-PCI bridge many failures that could occur with an I/O card will be isolated to that card only. In addition, pSeries servers from IBM have the concept of a PCI Enhanced Error Handling function (EEH.) This function, available for many I/O cards avoids a hardware machine check when parity errors occur on the PCI bus between an I/O card and the PCI-PCI bridge. Even with EEH, however, there are still some failures that could occur between the I/O card and the PHB which would require termination of all partitions with I/O cards under the PHB. In addition there are some failures that would require termination of all partitions under the entire I/O planar.

In short, for higher availability in logical partition, the logical partition should have exclusive ownership of all the PHBs containing any I/O card of the partition. Although of somewhat less importance, the logical partition should also have exclusive ownership of all the I/O planars containing any I/O card of the partition. In other words if any I/O card under a PHB is assigned to a partition, then all of the I/O cards under the PHB should be assigned to the partition and for further availability if any I/O card under an I/O planar is assigned to a partition, then all the I/O cards under the planar should be assigned to the partition.

Performance Vs. Availability in I/O Assignment

The last section defined rules for assignment of I/O cards in logical partitions to achieve the best availability. It would seem simple to follow the stated rules when the best availability for a partition is required.

However, from an efficiency standpoint the rules would tend to bunch all of the I/O cards of a partition under the least number of PHBs and I/O planars possible. There are two considerations that argue against that.

First is that configurations could be designed with redundant cards in a partition to allow for failover from one card to another on an unrecoverable error. To take full advantage of the redundancy, the I/O cards in question should really be in separate I/O planars. This would allow fail-over for any type of I/O error on the entire planar (although a reboot may be required.) This presumes, of course, that all necessary cards are redundant for the partition.

Second is that from a performance standpoint, it is a good idea to spread high performance cards out among the available PHBs and HUB ports and to limit the number allowed under a PHB, planar or drawer. These can be described as performance rules that should be met.

In addition there are slot restrictions limiting where I/O cards can be plugged in to a system having to do with matching voltage and speed of the PCI cards. This are functional rules that have to be met.

Given an unlimited number of I/O drawers to work with, all of these performance, function and availability rules could be satisfied in a system.

However, it is also desirable to limit the amount of I/O drawers in a system both because there is a limit to the number a system can support and practically because adding I/O drawers to a system adds cost to the system.

Therefore, satisfying all of the performance, function and availability rules for a system while minimizing the number of I/O drawers becomes an optimization problem.

When the first logically partitionable servers were shipped for pSeries, rules were published that, when followed, would insure a high level of card performance and maintain the functional requirements.

If a system were ordered with a given set of I/O cards and a number of I/O drawers, IBM would manufacture those systems using those guidelines without giving any consideration to availability in a partitioned environment.

IBM did publish high availability guidelines stating that for best availability, no two partitions should share a PHB and no two partitions should share an I/O planar.

These guidelines did not in any way tell the customer how to configure accordingly while still honoring the other placement rules.

Actually evaluating configurations was, perhaps, believed to be simple enough that customers could manage it manually. In practice, evaluation turned out to be far more tedious than imagined and if customer were aware of the tradeoffs, they might settle for buying more I/O drawers than necessary or configuring with less availability than would theoretically be possible.

Competitors still limited by hard partitioning (or hard partitioning with virtual partitioning) are not yet faced with this optimization problem so long as they do not attempt a logical partitioning approach.

Therefore, there is a need in the art for means of understanding how to place I/O cards physically into a server so that the logical partitions assigned to the server enjoy a high level of card performance, insuring that each partition maintains the highest level of availability, but minimizing the number of I/O drawers required to accomplish this.

SUMMARY OF THE INVENTION

The present invention teaches a means and system of describing rules for performance and availability for a system with respect to individual adapter cards and I/O drawers. It describes a means of scoring system configurations by how well they conform to the defined rules. It also describes a means of scoring the relative value of the placement of individual cards and I/O slots. It then defines a means of placing I/O cards into I/O slots for a defined number of I/O drawers following the rules and achieving the best individual scores for cards and slots. It also optimizes the placement to achieve the best possible system score. Optimization is first done at the individual card level, then as needed at a processor host bus level, then at an I/O planar level.

The present invention also describes a means of adding and deleting I/O drawers as needed to provide an optimized configuration as represented by an optimal system score with the fewest number of I/O drawers.

The present invention advances the art by applying an optimization routine to consider availability as well as performance and function as opposed to the prior state of the art where placement rules took little account of partitioning requirements. This approach can be applied to optimize configurations before purchase to determine how much hardware is required, that it can be applied during manufacturing in order to properly configure systems before shipment, that it can be applied when upgrades to systems are ordered or configured, and that it can be applied dynamically whenever it is desired to move resources among partitions in a system or to add resources previously unconfigured.

The disclosure details the process used to evaluate availability. It presumes an adequate set of rules already exist for ensuring placement of cards for function and performance.

This disclosure also teaches the ability to evaluate existing configurations as well as to suggest placement and optimizations. The discussion specifically deals with PCI cards but would be applicable to any I/O arrangement having similar connection characteristics.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
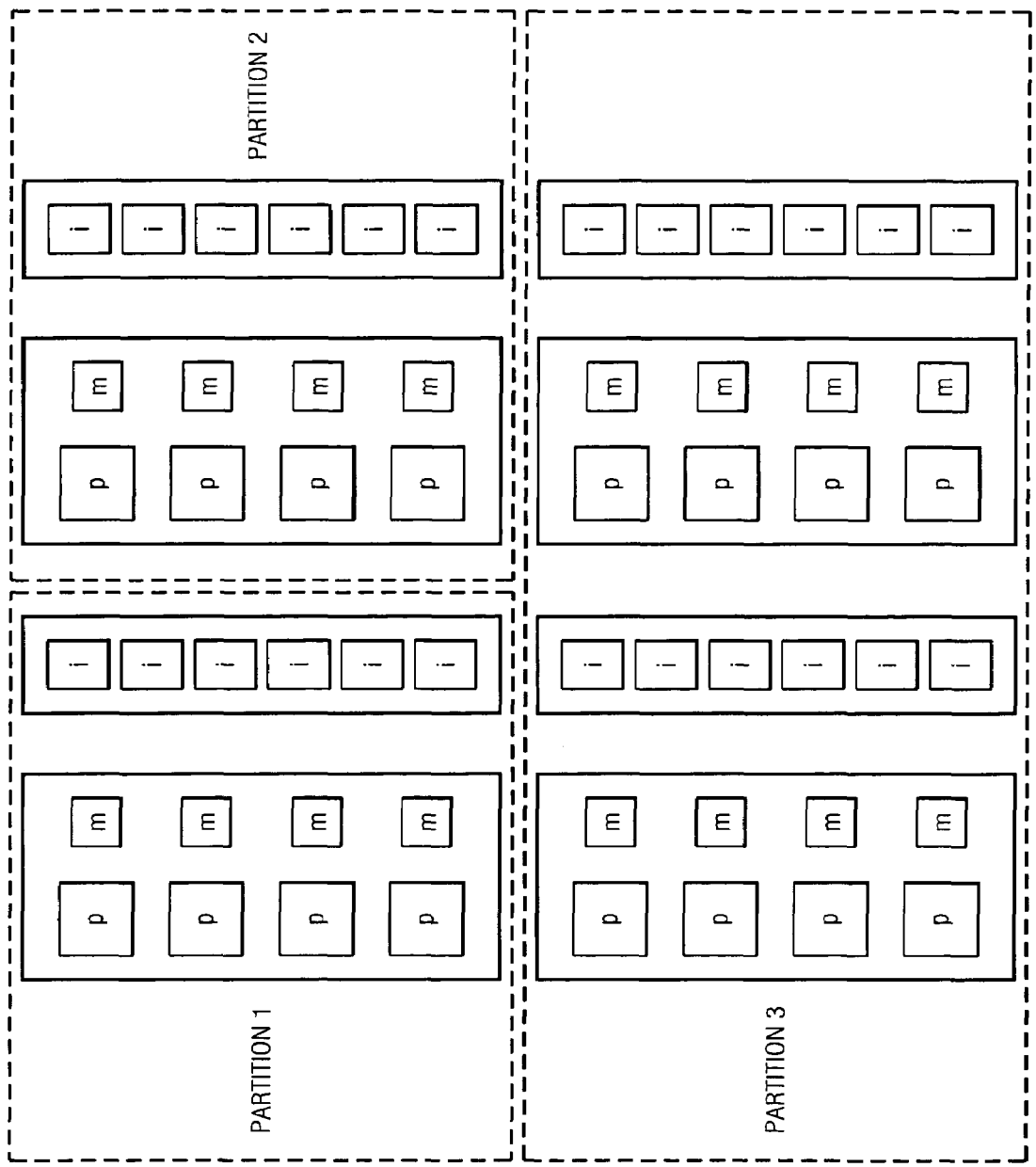
FIG. 1 describes an example of physical partitioning.
Figure 2:
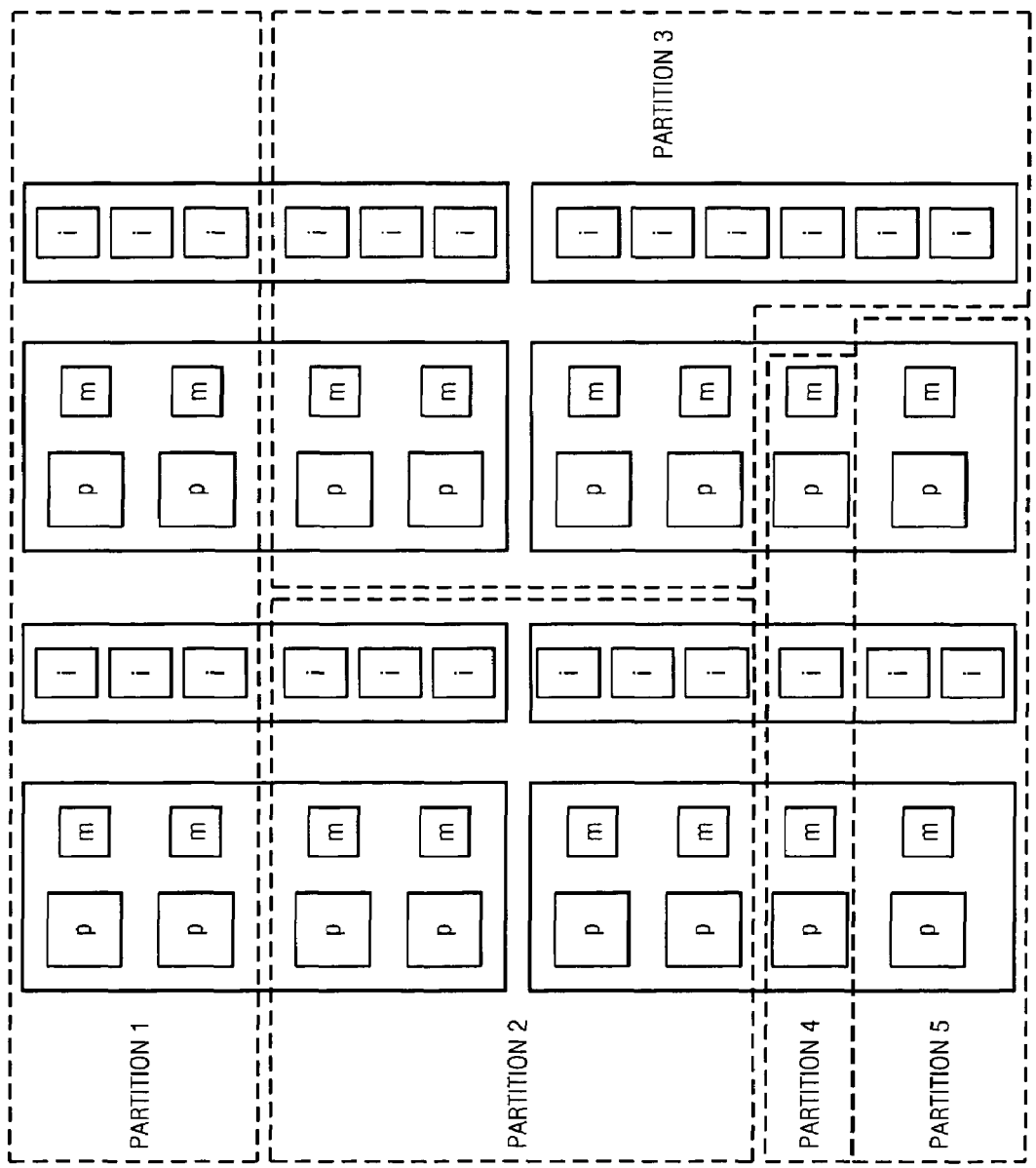
FIG. 2 describes an example of logical partitioning.
Figure 3:
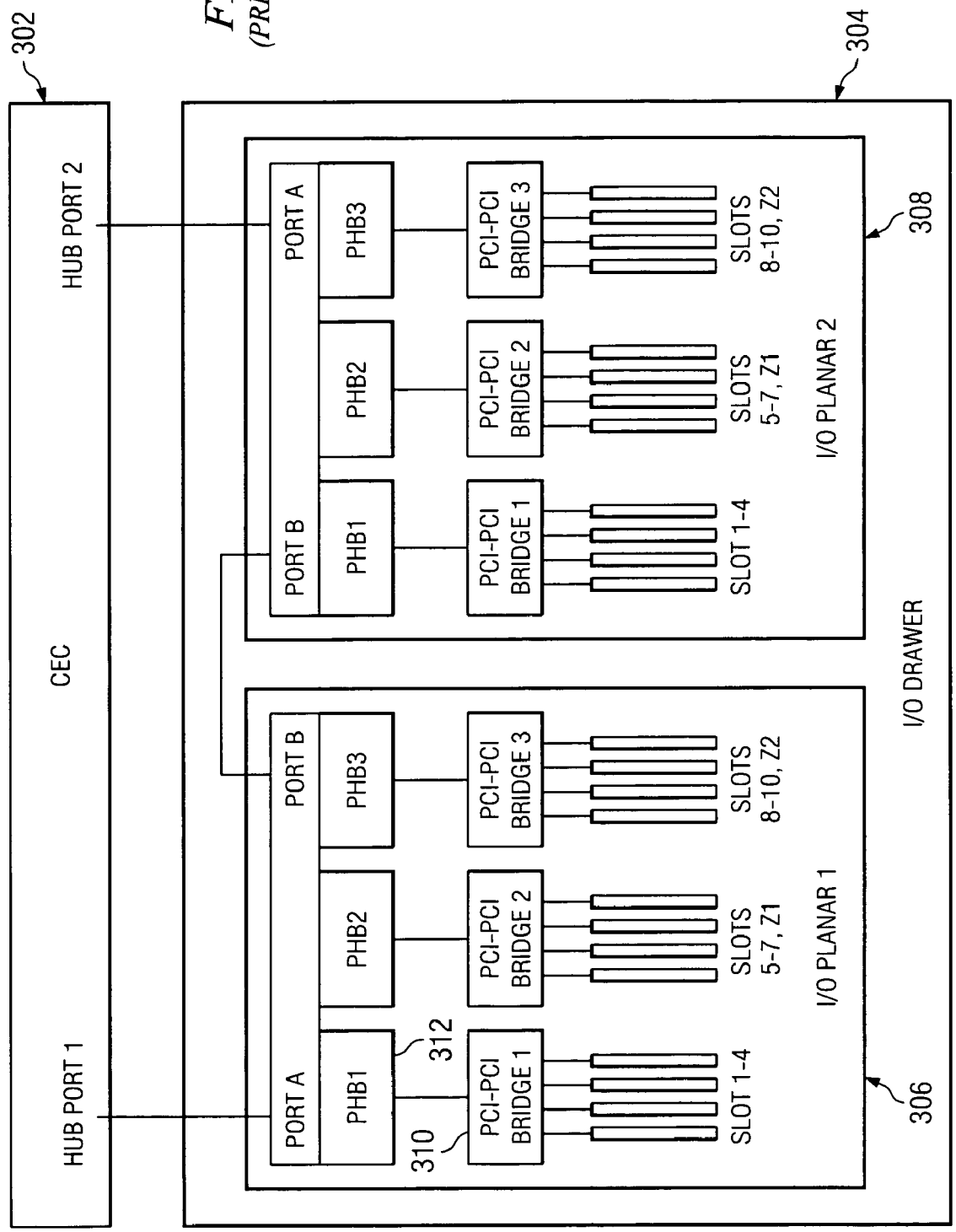
FIG. 3 shows a block diagram of a simple server model with a single I/O drawer.
Figure 4:
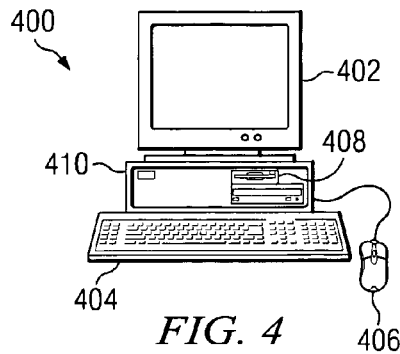
FIG. 4 shows a computer system consistent with implementing a preferred embodiment of the present invention.

With reference now to the figures and in particular with reference to FIG. 4, a pictorial representation of a data processing system in which the present invention may be implemented is depicted in accordance with a preferred embodiment of the present invention. A computer 400 is depicted which includes a system unit 410, a video display terminal 402, a keyboard 404, storage devices 408, which may include floppy drives and other types of permanent and removable storage media, and mouse 406. Additional input devices may be included with personal computer 400, such as, for example, a joystick, touchpad, touch screen, trackball, microphone, and the like. Computer 400 can be implemented using any suitable computer. Although the depicted representation shows a computer, other embodiments of the present invention may be implemented in other types of data processing systems, such as a network computer. Computer 400 also preferably includes a graphical user interface that may be implemented by means of systems software residing in computer readable media in operation within computer 400.

Figure 5:
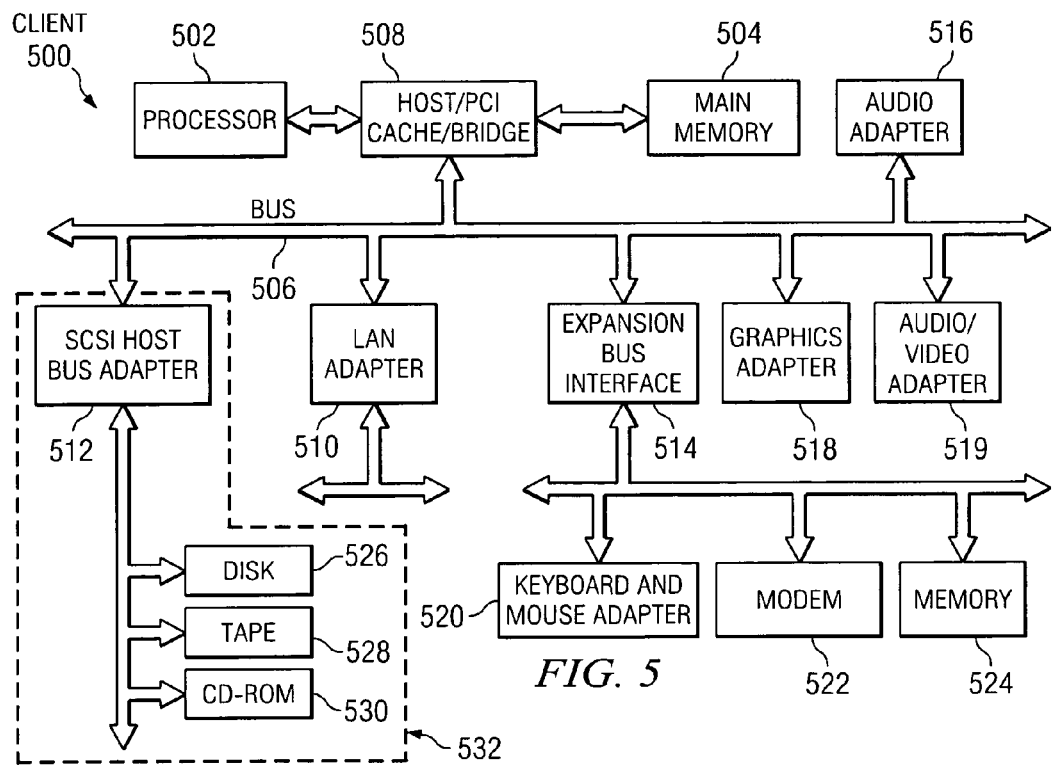
FIG. 5 shows the functional parts of a computer system.

With reference now to FIG. 5, a block diagram of a data processing system is shown in which the present invention may be implemented. Data processing system 500 is an example of a computer, such as computer 400 in FIG. 4, in which code or instructions implementing the processes of the present invention may be located. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. For the purposes of the present invention, multiple PCI bridges are preferred so as to provide isolation between some of the slots, allowing implementation of the partitioned management scheme described below.

Also in the depicted example, local area network (LAN) adapter 510, small computer system interface SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. SCSI host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system that supports partitioning, such as AIX™. An object oriented programming system such as Java may run in conjunction with the operating system and provides calls to the operating system from Java programs or applications executing on data processing system 500. "Java" is a trademark of Sun Microsystems, Inc. Instructions for the operating system, the object-oriented programming system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

For example, data processing system 500, if optionally configured as a network computer, may not include SCSI host bus adapter 512, hard disk drive 526, tape drive 528, and CD-ROM 530, as noted by dotted line 532 in FIG. 5 denoting optional inclusion. In that case, the computer, to be properly called a client computer, must include some type of network communication interface, such as LAN adapter 510, modem 522, or the like. As another example, data processing system 500 may be a stand-alone system configured to be bootable without relying on some type of network communication interface, whether or not data processing system 500 comprises some type of network communication interface. As a further example, data processing system 500 may be a personal digital assistant (PDA), which is configured with ROM and/or flash ROM to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

The processes of the present invention are performed by processor 502 using computer implemented instructions, which may be located in a memory such as, for example, main memory 504, memory 524, or in one or more peripheral devices 526–530.

As previously mentioned there are a number of rules for plugging cards into slots that limit what one can do based on physical limitations of the slots and on performance considerations.

Plugging Rules

The individual rules which restrict where a card can be plugged are sometimes based on performance reasons and sometimes based on specific characteristics or requirements of the cards and systems themselves. Any such rule, whether existing for performance or function reasons can more simply be called a "plugging rules" and can be summarized as follows.

Max rules state a maximum of how many cards of a certain type (as represented by feature code) can be plugged into a system, a drawer, a planar, a Hub, a PHB or a partition.

Other rules state how many combined of more than one feature code can be plugged into these areas.

For optimization purposes it is presumed that these rules must always be met. A card will never be plugged in such a way that the rules are violated even if this means leaving a card unplugged.

Min rules state a minimum number of cards required in a system or a minimum of a combination of several cards.

For optimization purposes it is presumed that these rules must also always be met.

Directed placement rules state that a given slot in an I/O planar must be occupied by a card from a list of feature codes.

In doing optimization, these rules must be met if there is any possibility of doing so. (I.E. the necessary cards in the configuration exist that fulfill the requirements.)

In some cases one logical I/O function may be performed by more than one separate I/O card plugged into separate I/O slots. In such a case, the group of cards would be required to be plugged under the same PHB. The Mother/Daughter rules would state that one card would be considered primary for placement purposes (the Mother card) and that the Daughter card(s) would have to be placed under the same PHB as the Mother. In doing optimization, the mother/daughter rules would also be honored.

Slot plugging rules state in which slots it is allowed to plug a card into a system at all. These rules come from a combination of things such as: a card does not fit into a slot due to word size or speed of the PCI bus, or a card could be plugged into a slot, but doing so would unduly harm performance.

For optimization purposes, slot plugging rules list all of the I/O slots in an I/O drawer a given card can be plugged in to. The list may be ordered such that the first slot is the most desirable for the card to be plugged in to, if plugged into that I/O drawer, and the last listed slot would be the least. Desirability in this case may mean that a given card would perform better in an earlier listed slot, or it may simply mean that the slots were listed in a certain way as to insure that cards with like performance characteristics are spread out in a system among all the available slots.

For optimization it is the goal to insure that all cards are plugged into slots supported by the slot plugging rules. In the disclosed process so long as all cards are plugged into a listed slot, then the system is considered properly optimized from a performance standpoint.

Availability Rules

For highest availability in a system it is often desirable for a partition to have two physical copies of each card. Thus if one card fails to function properly, failover to the redundant card may allow the system to continue to function. For this disclosure, two cards in a partition that can be used redundantly in this way are said to be twins.

With that definition, the availability rules honored by the disclosed process, in order of importance from most to least are as follows:

a) No cards that are twins of each other in a partition are located under the same PHB b) No cards that are twins of each other in a partition are located under the same I/O Planar c) No cards from more than one partition are located under the same PHB d) No cards from more than one partition are located under the same I/O Planar A system is said to be fully or completely optimized from an availability standpoint if all the defined cards are plugged into an I/O slot honoring the rules a-d above.

If not possible to accomplish these, then the following rules are attempted to be honored, in order of importance, to provide compromised but at least some level of availability consideration:

e) If an card has no EEH support, only one partition should be allowed under the same PHB as that card.

f) No more than two partitions are represented by cards under a PHB g) No more than two partitions are represented by cards under an I/O planar.

Main Process Description

In its entirety the disclosed process provides a method of optimizing the placement of PCI cards in a given system for a given set of PCI cards. The optimization includes, given an ordered list set of possible I/O drawers that could be supported by the system, specifying the minimum number of I/O drawers needed to satisfy the performance, function and availability requirements.

A subset of the entire process evaluates and optimizes a placement of cards given a specific set of I/O drawers for a given system. The process will satisfy all the pertinent plugging rules and availability requirements if possible If not possible to satisfy all the requirements, it will generate a less than perfect optimized configuration with a description of deficiencies.

In specifying the system to be evaluated, the process assumes an enumeration of the specific I/O cards to be included in the system. This description includes specifying the partition each card is to be incorporated into. For failover purposes, cards that are intended to be twins of each other in a partition would need to be so designated.

In the system description a complete or partial initial placement of cards into slots can be given or the process can begin with no cards placed.

If initial placement of all the cards in a system is described, the process can indicate whether or not all the cards are optimally placed according to the previous definition and will use the original optimization as a starting point.

For illustration purposes, if a some system to be configured were to contain 4 partitions (labeled 1–4) and 25 I/O card (labeled a1–a25) of types labeled 1111–1114, and could contain from one to 5 I/O drawers, each having 12 slots, input to the process could include information such as found in Table 1 below.

| Illustration of Process Input for a Specific Configuration | |
|---|---|
| Enumeration of partitions | List of possible I/O Drawers |
| partition 1 priority 1 | drawer 1 type an_io_drawer |
| partition 2 priority 2 | drawer 2 type an_io_drawer |
| partition 3 priority 3 | drawer 3 type an_io_drawer |

| Illustration of Process Input for a Specific Configuration | |
| --- | --- |
| partition 4 priority 4 | drawer 4 type an_io_drawer |
| partition 5 priority 5 | drawer 5 type an_io_drawer |
| | Starting I/O Drawer Number |
| | starting drawer number = 3 |
| | minimum number of I/O drawers allowed = 1 |
| | maximum number of I/O drawers allowed = 5 |
| List of cards | |
| card a1 type 1111 partition 1 twin of a2 | |
| card a2 type 1111 partition 1 twin of a1 | |
| card a3 type 1111 partition 2 twin of a4 | |
| card a4 type 1111 partition 2 twin of a3 | |
| card a5 type 1111 partition 3 twin of a6 | |
| card a6 type 1111 partition 3 twin of a5 | |
| card a7 type 1111 partition 3 twin of a8 | |
| card a8 type 1111 partition 3 twin of a7 | |
| card a9 type 1112 partition 1 | |
| card a10 type 1112 partition 2 | |
| card a11 type 1112 partition 3 | |
| card a12 type 1112 partition 4 | |
| card a13 type 1113 partition 1 | |
| card a14 type 1113 partition 1 | |
| card a15 type 1113 partition 2 | |
| card a16 type 1113 partition 2 | |
| card a17 type 1113 partition 3 | |
| card a18 type 1113 partition 3 | |
| card a19 type 1113 partition 4 | |
| card a20 type 1113 partition 4 | |
| card a21 type 1114 partition 1 | |
| card a22 type 1114 partition 1 | |
| card a23 type 1114 partition 1 | |
| card a24 type 1114 partition 4 | |
| card a25 type 1114 partition 4 | |

Not shown here, but input could include an initial drawer and slot placement for each card.

Additionally, input for the process would include a description of the type of system being configured. This input would enumerate whatever performance and function rules would need to be honored for the system (e.g. maximum of 5 cards of type 1114 in the system.) The input would also specify information about the minimum and maximum number of I/O drawers allowed in the system. For the I/O drawer type specified, detailed information would also need to be supplied, enumerating each slot in the drawer, explaining under what PHB and I/O planar each slot lies and specific rules about each slot. Included in this information would be rules relative to the I/O drawer for each I/O card type supported including the list of slots the card would be allowed to be plugged in to, whether the card had a daughter card and whether the system supported EEH for the card.

A sample of some of the information that could be supplied is found in Table 2:

| Illustration of Process Input for a Type of System | |
| --- | --- |
| System Rules relating to cards plugging | Directed placement rules |
| max of 40 combined cards 1111 and 1112 | Directed placement in first drawer slot P2-I10 one of card 1112 or 1113 |
| min of 2 combined cards 1113 and 1114 | |
| EEH Rules | |
| no eeh support cards 1114 | |
| Drawer Defined | Cards Defined |
| drawer_type an_io_drawer | card_type 1111 |
| Slot I1 planar P1 hub 1 phb 1 | slots allowed: |
| Slot I2 planar P1 hub 1 phb 1 | P1-I1 P1-I3 P1-I5 P1-I7 P1-I9 |
| Slot I3 planar P1 hub 1 phb 1 | P2-I1 P2-I3 P2-I5 P2-I7 P2-I9 |
| Slot I4 planar P1 hub 1 phb 1 | max_under_phb 2 max_under_hub 2 |
| Slot I5 planar P1 hub 1 phb 2 | max_under_drawer 4 max_under_lpar 4 |
| Slot I6 planar P1 hub 1 phb 2 | max_under_system 4 |
| Slot I7 planar P1 hub 1 phb 2 | card_type 1112 |

-continued

Illustration of Process Input for a Type of System

| | |
|---|---|
| Slot Z1 planar P1 hub 1 phb 2 | slots allowed: |
| Slot I8 planar P1 hub 1 phb 3 | P1-I2 P2-I2 P1-I4 P2-I4 P1-I6 P2-I6 |
| Slot I9 planar P1 hub 1 phb 3 | P1-I8 P2-I8 P1-I10 P2-I10 |
| Slot I10 planar P1 hub 1 phb 3 | card_type 1113 |
| Slot Z2 planar P1 hub 1 phb 3 | slots allowed: |
| Slot I1 planar P2 hub 2 phb 4 | P2-I10 P1-I10 P2-I6 P1-I6 P2-I2 P1-I2 |
| Slot I2 planar P2 hub 2 phb 4 | card_type 1114 |
| Slot I3 planar P2 hub 2 phb 4 | slots allowed: |
| Slot I4 planar P2 hub 2 phb 4 | P1-Z1 P1-Z2 P2-Z1 P2-Z2 |
| Slot I5 planar P2 hub 2 phb 5 | max_under_phb 2 max_under_system 10 |
| Slot I6 planar P2 hub 2 phb 5 | |
| Slot I7 planar P2 hub 2 phb 5 | |
| Slot Z1 planar P2 hub 2 phb 5 | |
| Slot I8 planar P2 hub 2 phb 6 | |
| Slot I9 planar P2 hub 2 phb 6 | |
| Slot I10 planar P2 hub 2 phb 6 | |
| Slot Z2 planar P2 hub 2 phb 6 | |

Note also that some level of blank I/O slots may be desired within a system to allow for the possibility of future expansion. Card types can be defined that are meant to describe "blank" slots reserved for future expansion. Different types of blank cards could be given different performance rules as desired. Cards of Blank card types can then be described as input to the process and assigned to partitions as desired.

The ultimate output for the process would include an enumeration of the I/O drawers required to optimally fit the cards given and a placement by I/O drawer and slot of each card.

Figure 6:
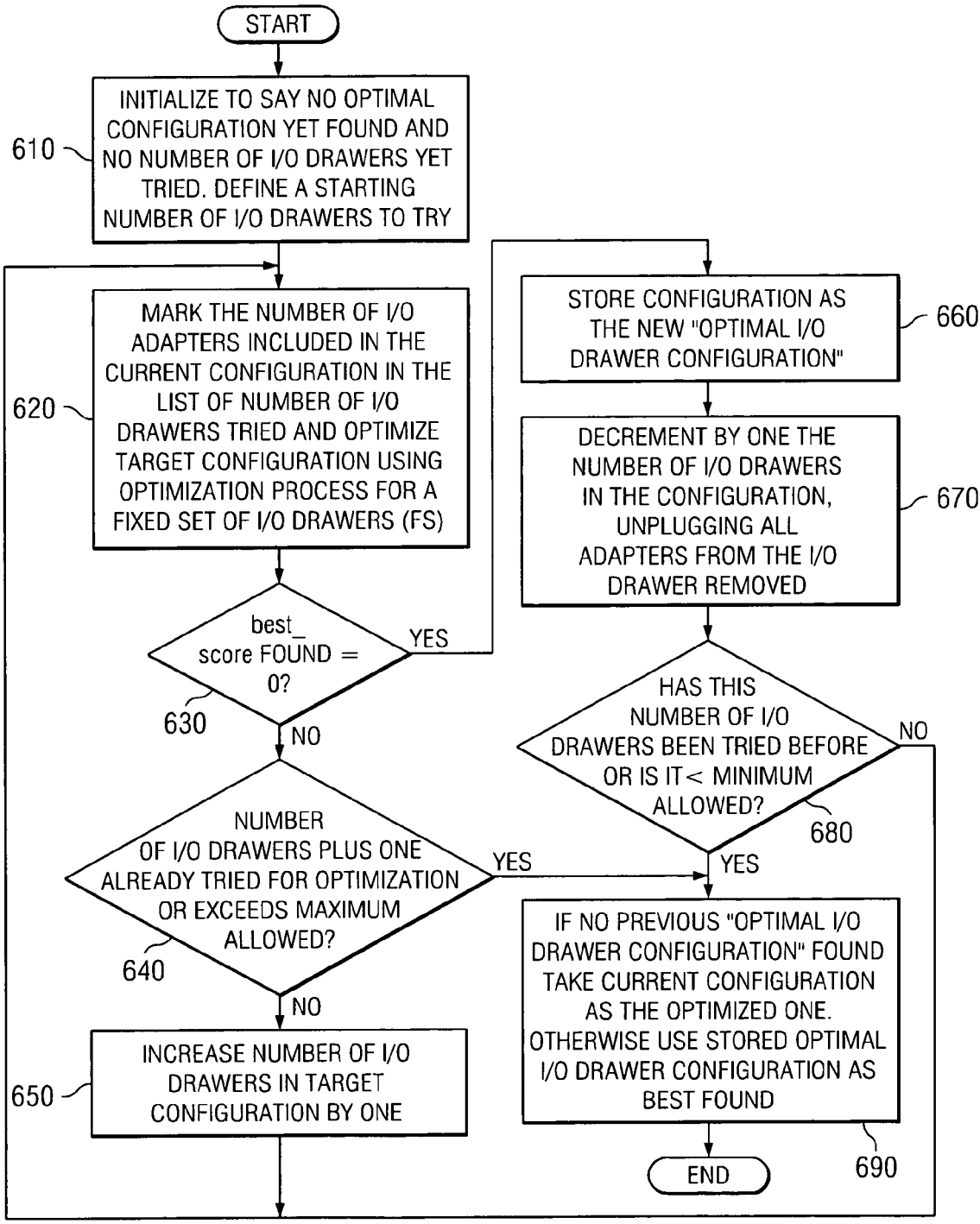
FIG. 6 shows the overall optimization algorithm of a preferred embodiment of the present invention.

FIG. 6 shows the overall optimization process presuming the kind of input described previously.

Again, the end result of this process will be an optimized configuration with the minimum number of I/O drawers necessary to achieve the optimization.

As indicated earlier, input to the process would include a list of I/O drawers that could be included in the system (including a minimum and maximum number of drawers allowed.) In the example previously given, it was presumed that there could be up to 5 I/O drawers, labeled 1–5, all of the same type, with a minimum of 1 I/O drawer required. The input specified that the process would start presuming 3 I/O drawers would be needed.

Thus the process would start, attempting to place all the cards in I/O drawers 1, 2 and 3. The actual number of I/O drawers to initially presume is just a guess and ultimately doesn't matter to the process. 1 drawer could always be presumed for a start, or the maximum number could always be presumed. Guessing close to the correct answer would result in fewer iterations through the process, however.

First the process is initialized (step 610). The block clears variables used later on including the last optimized configuration found and a list that stores what different I/O configurations had been found as represented by the number of I/O drawers tried. The initial number of I/O drawers to be tried is set from input to the process.

Next the number of I/O drawers to be tried is marked down in the list of configurations tried (step 620). The Optimization Process for a Fixed Set Of I/O drawers is then executed (FS.) This process, described later, yields an optimized placement of cards for the given set of I/O drawers. It also yields a best_score value which describes how well the particular configuration was optimized. A score of 0 indicates that the configuration was completely optimized with respect to the specified performance, function and availability rules.

Next, the best_score returned in step 620 is compared to 0 (step 630). If 0, then the optimization was ideal for the given set of I/O drawers and flow goes to step 660.

If the score is other than 0, then with the given number of I/O drawers, the configuration could not be completely optimized. 1 is added to the number of I/O drawers proposed to be in the configuration and that is compared with maximum allowed and checked with the list of the number of I/O drawers already found (step 640). If that number exceeds the maximum or that number of cards has already been tried, then flows goes over to step 690.

Otherwise, flow continues with step 650 where the number of I/O drawers in the target configuration is increased by one as proposed in the previous block. Flow then returns to step 620 where that new configuration is optimized.

Step 660 is reached from step 630 if the best_score found is zero, indicating an ideal optimization for the given set of I/O drawers was found. In step 660, the configuration so found is stored as the best optimized configuration thus far found.

In step 670, the number of I/O drawers to use in the configuration is decremented by one and any cards plugged into slots of the I/O drawer thus deleted from the configuration are unplugged so that they can be placed in the remaining drawers.

In step 680 a check is made to see whether this new number of I/O drawers is less than the minimum allowed. If so then flow continues with step 690. If not, then flow returns to step 620 where the new configuration is optimized.

Step 690 is reached from step 640 or step 680. When reached, either the ideal configuration was stored from an earlier optimization or else the maximum number of I/O drawers was found without finding an ideal optimization. If a previous optimization was found, it is reported in this block to end the process. Otherwise, the last configuration tried, having the maximum allowed I/O drawers would be reported as the process terminates, but the reported score being non-zero would indicate that it was not ideally optimized.

It should be noted that in this process the minimum number of I/O drawers allowed does not have to correspond to a physical machine limitation. In the example, if the maximum and minimum were set to 3, then the process would only be tried with a system configuration consisting of 3 I/O drawers. This allows the process to be used for evaluation and optimization of a configuration when the number of I/O drawers is fixed.

The heart of the optimization process being disclosed is the means of optimizing a configuration for performance, function and availability for a given fixed set of I/O drawers.

Figure 7:
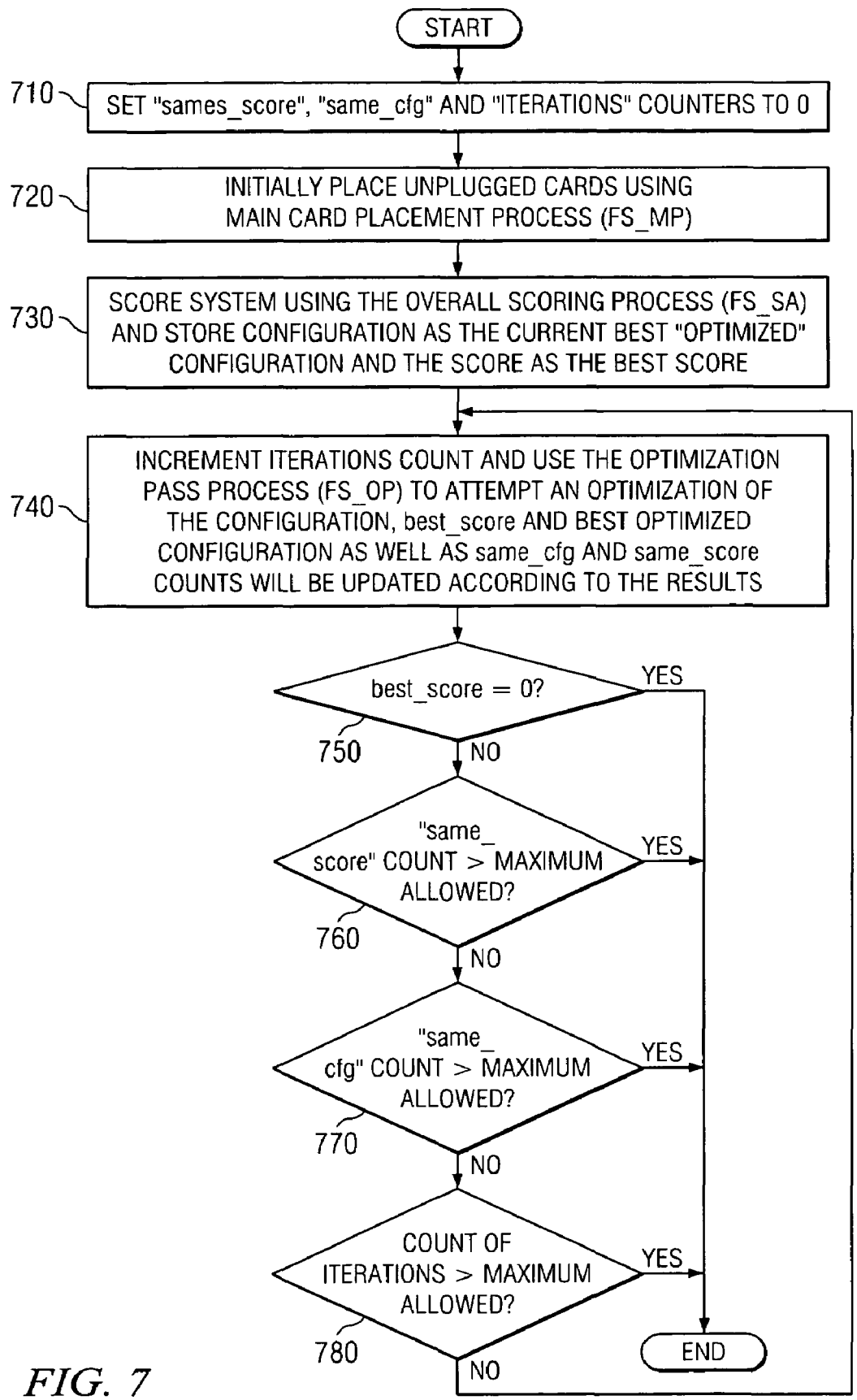
FIG. 7 shows an optimization algorithm for a fixed set of I/O drawers.

This process can begin with an initial placement of some or all of the I/O cards in to slots, or with the presumption that none of the cards are plugged at the start of the process. FIG. 7: shows the essential outline of the process.

The process begins in FIG. 7 with step 710. In this block certain variables are initialized that keep track of how successive iterations of optimizations performed in order to recognize when to terminate the process if the configuration can not be completely optimized. These flags set are same_scores which counts the number of times the same score is encountered in an optimization iteration loop with no improvement in optimization, same_cfg which counts the number of times the exact same configuration is encountered in a loop with no improvement in optimization, and "interations" counts which holds the total number of optimization passes tried within the process.

From step 710, flow proceeds to step 720 where an attempt is made to place all unplugged cards into the system as well as to force cards into certain slots where required. The detailed Main Card Placement process (FS_MP) used is described later in this disclosure.

After unplugged cards have been placed, step 730 is used to initially score the resulting system configuration using the Overall Scoring Process (FS_SA, also described later.) The configuration is stored by this block and the resulting score is also stored as the current best configuration and the current best system scores respectfully.

Step 740 is used to increment the count of interations and execute the Optimization Pass Process (FS_OP.) Internally in the process the overall best system score found may be updated and the configuration stored if the resulting configuration is better than the previous. In addition the same_cfg and same_score counts may be updated.

Step 750 determines if the configuration has been fully optimized as determined by the best score found being 0. If so, the process ends in complete success.

If not, flow proceeds to step 760 for a check of whether the same_score has been seen more than an arbitrary maximum number of times indicating that the process should be terminated due to a lack of progress without a complete optimization being found. If not terminated by step 760, step 770 then checks to see whether the same_cfg has been seen more than an arbitrary maximum number of times also indicating that the process should be terminated without a complete optimization. If not terminated, step 780 determines if an arbitrary maximum number of iterations through the Optimization Pass process has been exceeded by checking the interations cnt. If exceeded, the process also terminates. If not, flow proceeds back to step 730 for another Optimization pass.

At termination of the process the last stored best optimized configuration represents the best card placement that can be found by the process for the given configuration. If the best_score is zero, the configuration is considered optimal.

Main Card Placement Process (FS_MP)

This process is a sub-process of the Optimization Process For a Fixed Set of I/O Drawers (FS) used to place unplugged cards and also to insure that slots that are required (directed) to have cards of a certain type placed in them have the right type of card placed.

The process presumes within its input that the partitions are ordered according to a priority scheme indicating, if it is not possible to completely optimize for availability, which partitions are most important to optimize. If this is a meaningless parameter in the system being optimized, all the partitions can be given the same value.

Figure 8:
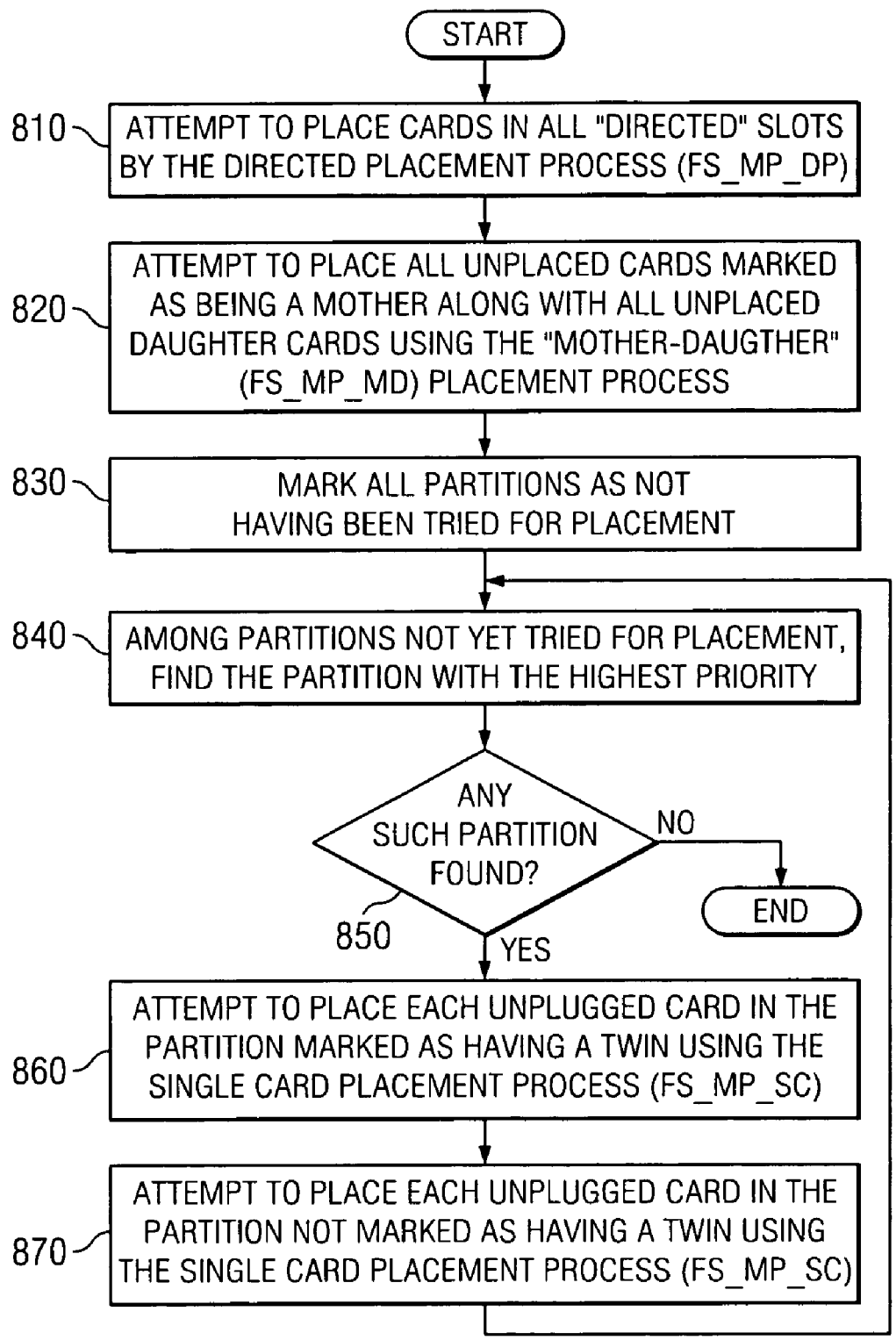
FIG. 8 shows an algorithm of main card placement consistent with a preferred embodiment.

The process, shown in FIG. 8, begins with step 810 which shows use of the directed placement process (FS_MP_DP) to navigate all of the slots of the system looking for those which are required to have cards from a specific set of feature codes plugged in to them. The process will place cards from the appropriate sets if possible.

Step 820 proceeds from step 810 and shows that the "mother-daughter" placement process (FS_MP_MD) is next used. In the process each unplugged mother card is plugged into the best available slot, then the associated daughter card is plugged under the same PHB if possible. In this stage of placement, no attempt is made to unplug any cards to insure that the mother/daughter combinations are met. This presumes that there are generally few mother-daughter card combinations in a system. If this is incorrect, the optimization processes later would be used to optimize placement.

Step 830 is executed to prepare for general placement of the remaining cards by partition by setting a mark for each partition indicating that the partition has not yet been tried for placement.

Next step 840 selects the first encountered partition not yet tried for placement which has the highest priority. Prioritizing partitions is optional and depends on being able to identify which partitions it is most critical to have the highest availability for the cases when it is not possible to optimize the placement of every card in the system. If all partitions are marked with the same priority, the first partition encountered would be used.

Then step 850 determines whether or not such an available partition has been found. If not, then an attempt has been made to place all the cards of all partitions, and the process finishes.

If there is a partition to attempt, step 860 shows that the single card placement process (FS_MP_SC) is then used to attempt to place each card of the partition that is marked as having a twin. When all such cards have been attempted, step 870 shows using the same process to attempt to place the rest of the cards of the partition.

From step 870 flow returns to step 840 to optimize additional partitions Sub-Processes Used By Main Card Placement Process In general, the placement processes use what can be called a tiered scheme for plugging cards. The goodness associated with plugging a card into a slot is judged based on the following tiers:

| Adapter Optimization Tiers Explained | |
|---|---|
| Tier Name | Description |
| Tier_Unplugged | Card can not be plugged into slot without violating a plugging rule. |
| Tier_Any | Plugging violates no plugging rules but has none of the virtues of any of the better tiers below |

-continued

Adapter Optimization Tiers Explained

| Tier Name | Description |
| --- | --- |
| Tier_No_violations | Plugging violates no plugging rules and no twins are under the same planar and no card lacking EEH handling is under a PHB with cards from other partitions |
| Tier_Two_parts | Like the previous but also there are no more than 2 partitions in the planar where the card is plugged |
| Tier_One_phb | Like the previous but also there is only 1 partition under the PHB where the card is plugged |
| Tier_One_planar | Like the previous but also there is only 1 partition under the planar where the card is plugged |

Figure 9:
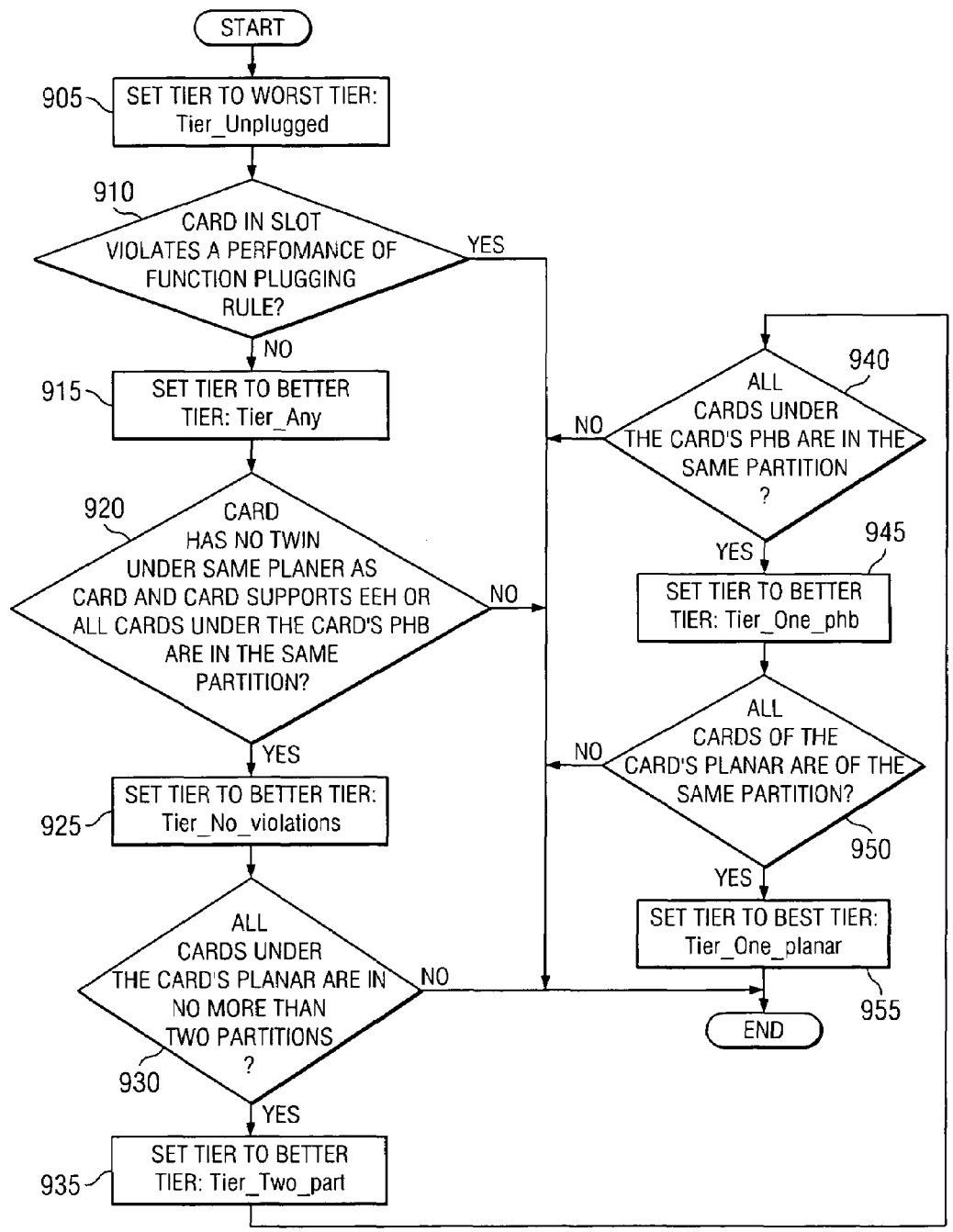
FIG. 9 shows a tier scoring algorithm consistent with a preferred embodiment.

With this set of definitions, the tier that a given card plugged into a slot can obtain can be scored using the Tier Scoring Process described in FIG. 9. This process is used in some of the specific placement processes described a bit later.

This process begins with block step 905 which presumes the worst tier for the card, Tier_Unplugged which suggests that the card violates a plugging rule when plugged into the slot and therefore should not be plugged into the slot. The process attempts to improve upon that base score to achieve the highest tier that plugging the card into the slot supports. In the description that follows, when the process terminates, the last tier value set will be the tier value returned by the process.

From step 905, flow proceeds to step 910 where a check is made as to whether plugging the card into the slot violates any of the defined performance or function plugging rules. If the Answer is yes, the card does violate a plugging rule, then the process terminates.

If the answer is no at step 910, flow proceeds to step 915 where the tier is set to Tier_Any. Flow then proceeds to step 920 where a check is made to see if the card has no twin under the same planar and that the system supports EEH for the card (where EEH is supported in the system for any card) or if there is no EEH support for the card, all the cards under the same PHB as the card are in the same partition. If the overall answer is no, the process terminates.

If the answer is yes, flow proceeds to step 925 where the tier is set to Tier_No_violations and flow continues with step 930. In step 930 a check is made to see if all the cards under the same planar as the card are in no more than two partitions. (I.E. the planar containing the card contains no more than 2 partitions.) If no, then the process terminates returning. Otherwise, flow proceeds to step 935.

In step 935, the tier is set to Tier_Two_part and flow proceeds to step 940 where a check is made to see if the PHB containing the card only has cards from one partition. If no, the process terminates. If yes, flow proceeds to step 945.

In step 945, the tier is set to Tier_One_phb. By step 950, a check is then made to see if all the cards under the planar the card is plugged to belong to only one partition. If not, the process terminates. If so, flow goes on to step 955 which sets the tier to Tier_One_planar. The process terminates at this point with Tier_One_planar being the best tier found.

Before any other placement, the optimization process for a fixed set of I/O drawers uses the Directed Placement Process looking for slots, with no cards plugged, that are designated as requiring a card of a certain set of types. These are slots that are known as requiring directed placement.

Figure 10:
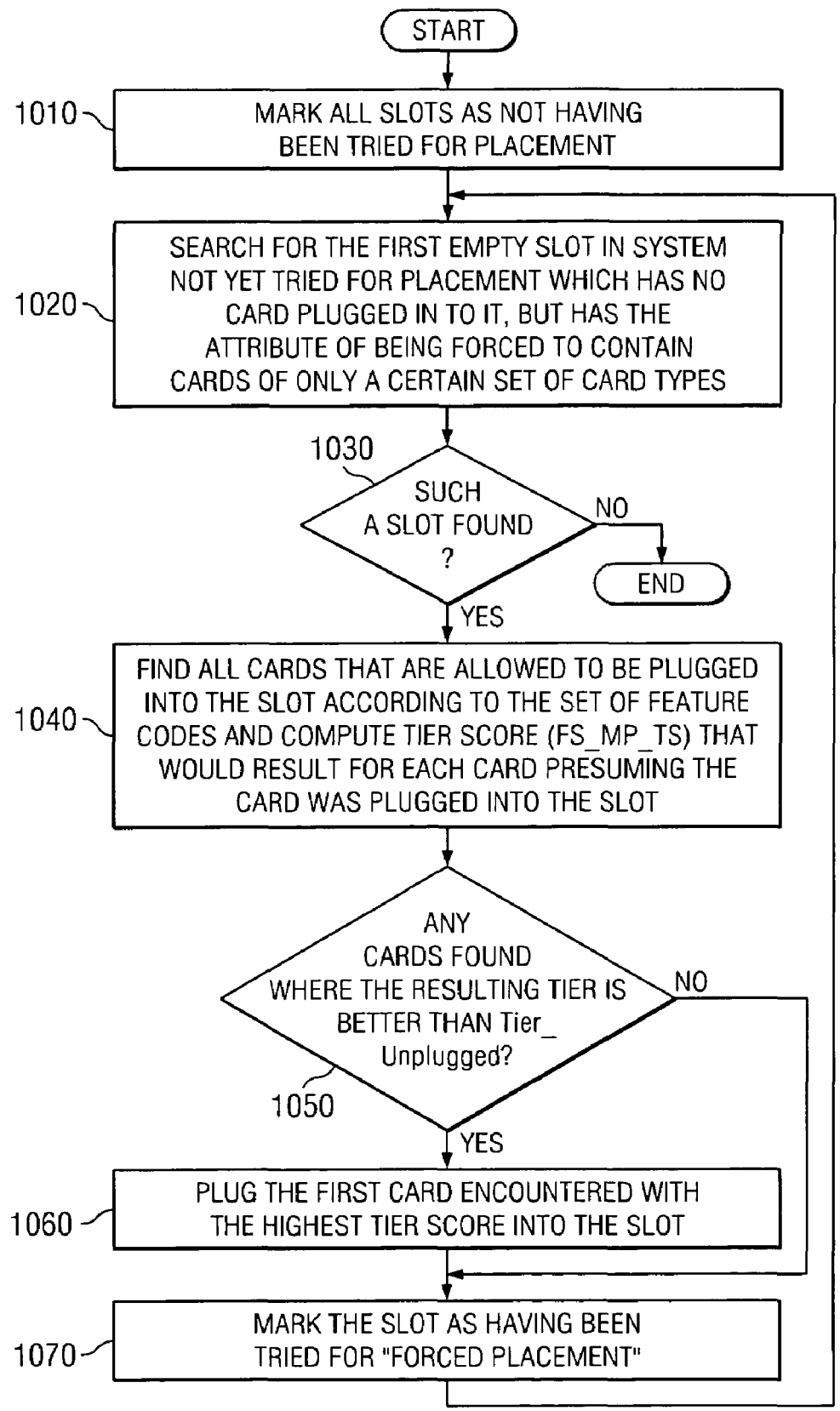
FIG. 10 shows a directed placement algorithm consistent with a preferred embodiment.

In the example configuration, the rules say that the first I/O drawer, planar 2 slot I10 must have either a card of type 1112 or 1113 plugged in to it. If there is no such card plugged into the slot, then the Directed Placement process ensures that a card is found and plugged into the slot. FIG. 10 describes the process for doing this directed placement.

In this process, step 1010 shows preparation by marking all the slots as not having been tried for placement. Step 1020 is executed next. This block tries to find the first empty slot, not yet tried for placement, that in fact requires cards from a specific set of card types but does not have a card plugged into it.

By step 1030, if no such card is found, the process ends. Otherwise, control is passed to step 1040 which finds all the cards in the system of a card type in the directed card type set. The card tier scoring scheme (FS_MP_TS) is then used to obtain the resulting score for each such card if placed into the slot.

By the next step, step 1050, if any such card were found, flow would pass to step 1060 where the first card with the best tier score would be plugged into the slot. Flow would then proceed to step 1070 where the slot would be marked as being been tried for placement. If in step 1050, no card were found, flow would immediately proceed to step 1070.

After step 1070, flow would return to step 1020 to search for the next "directed placement" slot.

A few cards are treated like mother/daughter combinations where the daughter must be in the same PHB as the mother. The Mother-Daughter placement process places all cards identified as having a daughter along with the daughters for the cards, attempting to ensure that the daughters are placed under the same PHB as the mother. (Placement of the daughters is performed using the tiered placement process, but limiting candidate slots are to those under the mother's PHB.)

Figure 11:
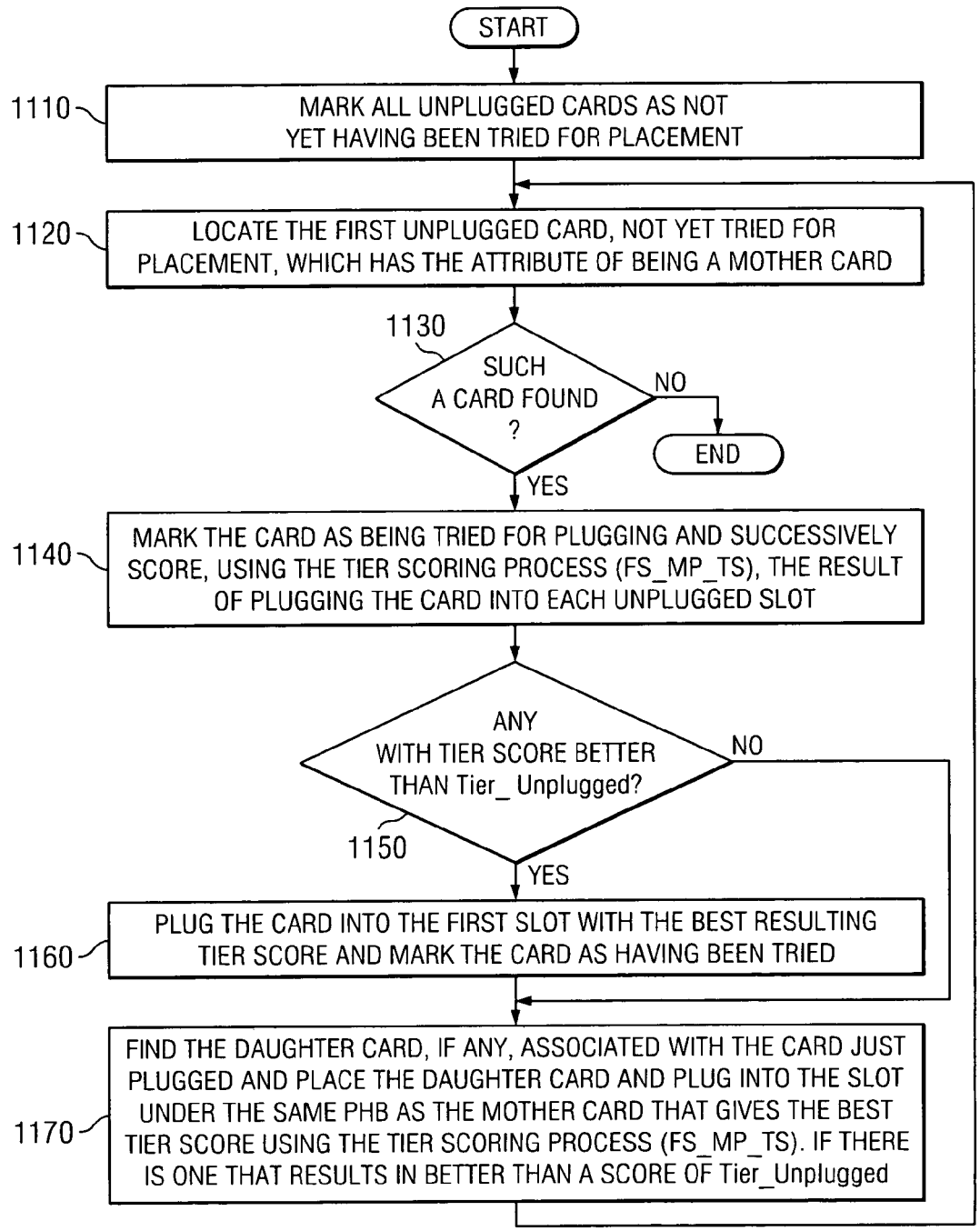
FIG. 11 shows a mother/daughter placement algorithm consistent with a preferred embodiment.

The specific Mother-Daughter placement process follows in FIG. 11.

For the process, preparation is done in step 1110 where all cards are marked as not having yet been tried for placement. Control then passes to step 1120 where the first unplugged, untried mother card is located. By step 1130, if no such card exists, the process ends.

Otherwise, by step 1140, the card is marked as being tried for plugging. In this block the tier scoring scheme (FS_MP_TS) is used to see what the resulting score would be of plugging the card into each slot in the system. By step 1150, if the score for any slot were better than Tier_unplugged (where Tier_Unplugged means the card can't be plugged into the slot) then execution continues with step 1160. Otherwise that block is skipped and step 1170 is executed next.

In step 1160, the card being placed is plugged into the first slot having the best tier score. Flow continues afterwards with step 1170 where an attempt is made to find the daughter card associated with the card just plugged and plug that daughter card into a slot in the same PHB as the mother card. This block does so by first finding the daughter card, if any, and then finding each unplugged slot under the PHB and score, by the tier scoring process, the result of plugging the daughter card into the slot. If any slot exists which the daughter can be plugged in to, the daughter will be plugged into first such slot with the best resulting tier score.

From step 1170, flow returns to step 1120 where the next mother card if any is located.

Figure 12:
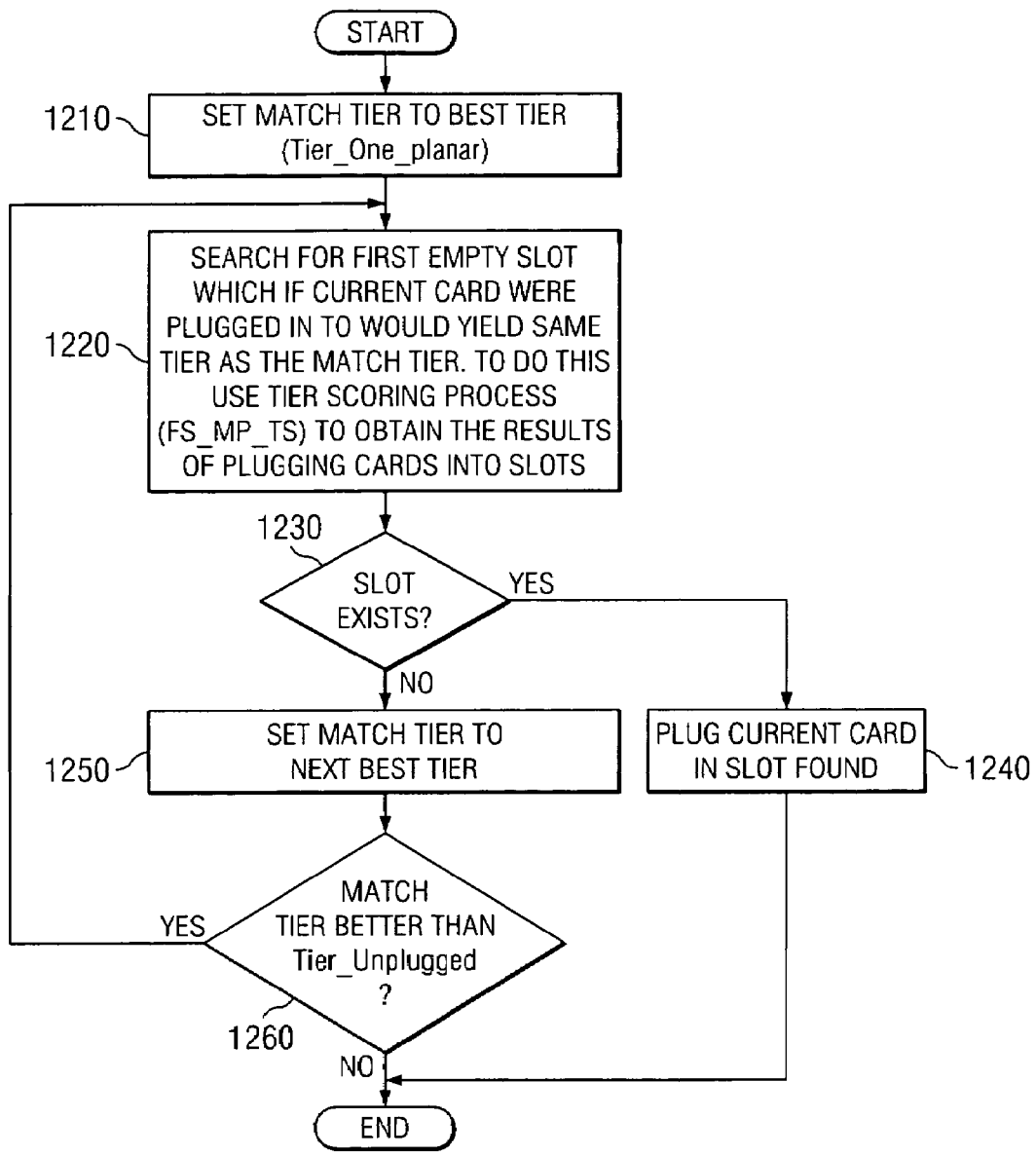
FIG. 12 shows a single card placement algorithm consistent with a preferred embodiment.

The single card placement process is used to attempt to find the best slot for and plug in a card selected by the main card placement process (FS_MP). The single card placement process can be illustrated as follows in FIG. 12.

The first execution block of the process is step 1210, where it is defined that the process will first attempt to place the subject card into a slot which would result in the best possible tier, Tier_One_planar. This value is placed in a variable known as the "match tier." Flow continues with step 1220 where a search is made of all empty slots to find the first one which, if the card were plugged into the slot, would yield the same tier score as the match tier. The Tier scoring process (FS_MP_TS) is used to find the tier score.

By step 1230 which follows, if such a slot exists, flow continues to step 1240 where the card is plugged into the slot found. The process then ends.

If by step 1230, no empty slot exists which would yield a score equal to the match tier, then flow goes to step 1250 where the match tier is set to the next best tier from its current value. By step 1260, then, if the tier set is equal to Tier_unplugged, the process must end with the card not placed. Otherwise, flow returns to step 1220 where an attempt is made to find a slot to match the tier set.

Overall Scoring Process (FS_SA)

Before being able to optimize a given system it is necessary to evaluate a configuration against the rules given. The overall scoring process (FA_SA) of the Optimization Process for a fixed set of I/O drawers does this evaluation. It should be noted that evaluation of a configuration can actually be done independently of whether any optimization is desired.

The actual scoring of a system in this process is done on a penalty scoring scheme (were the lowest score equates to the best optimization.)

The scoring scheme gives a numeric value to certain attributes of the system as follows:

| Tuning Parameter | Scoring Variables Default Value | Description |
| --- | --- | --- |
| Twin_phb_penalty | 10,000,000 | Twins under the same PHB |
| Twin_planar_penalty | 1,000,000 | Twins under the same planar |
| Daughter_penalty | 10,000,000 | Mother and daughter not under the same PHB |
| Eeh_penalty | 100,000 | A card that doesn't support EEH under a PHB with another partition |
| Phb_penalty | 10,000 | Two partitions under the same PHB |
| Planar_penalty | 1,000 | Two partitions under the same planar |
| Unplugged_penalty | 10,000,000 | A card unplugged |
| Directed_penalty | 10,000,000 | Slot with a directed card not in the slot |

Process-wise, the actual numeric values are not important, so long as the relative magnitude relationship is maintained.

Scoring can be applied to three separate elements, the entire system, cards defined for a system, and slots within the system.

Figure 13:
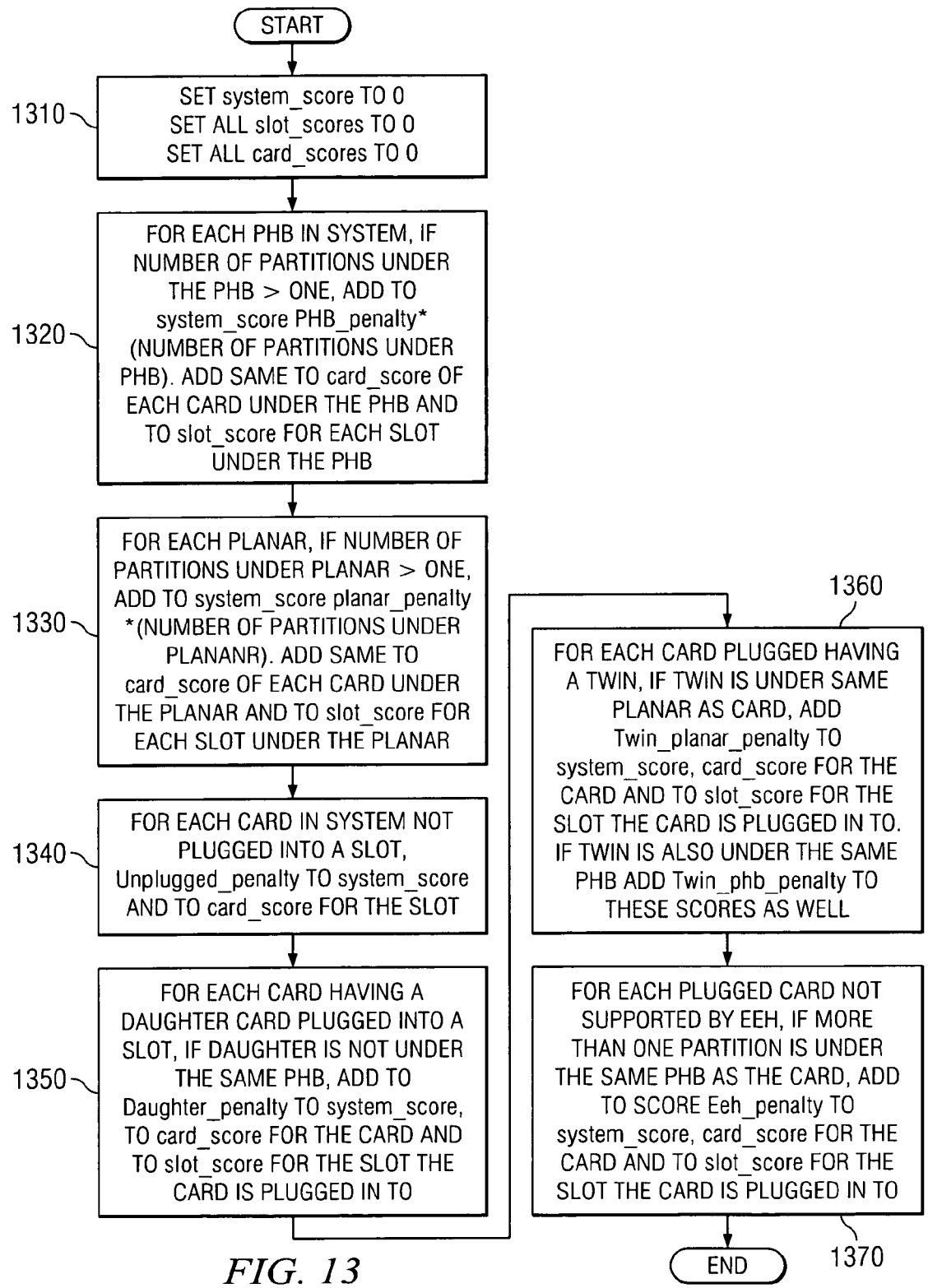
FIG. 13 shows a scoring algorithm consistent with a preferred embodiment.

The overall scoring process is shown in FIG. 13.

Step 1310 is the start of the process. It initializes all the scores to zero. The scores being tracked include an the overall system_score, a slot_score for each slot and card_score for each card. A perfect score for any of these elements is 0.

Flow proceeds to step 1320 where a penalty, PHB_penalty is added to the system score for each partition under each PHB if in excess of one. In describing the process a partition is said to be underneath a PHB if there is a slot under the PHB that is assigned to a partition. All slots containing a card must belong to a partition.

In step 1320, the PHB_penalty is also assessed to each card plugged into a slot under a PHB for each partition under the PHB if in excess of one. The same penalty is also assessed to each slot under a PHB for each partition under the PHB in excess of one.

Flow then proceeds to step 1330 where a Planar_penalty is assessed in the same way to the system, slots and card scores for partitions underneath a planar in excess of one.

After step 1330 is completed, step 1340 assesses the Unplugged_penalty to the system score for each card defined as being a part of the system but not currently plugged in to any slot.

Step 1340 also assesses the same Unplugged_penalty to the card score of each card not plugged in the system.

From step 1340, flow proceeds to step 1350 where a Daughter_penalty is assessed to the system for each plugged card in the system having a daughter card whose daughter card is not plugged in a slot under the same PHB as the card in question. The same penalty is assessed to the card score and to the slot score of the slot the card is plugged in to.

From step 1350, step 1360 assesses as Twin_planar_penalty for each plugged card having a twin whose twin is plugged in the same planar as the card. Also assessed is a Twin_phb_penalty for each plugged card having a twin whose twin is plugged under the same PHB. These penalties are assessed to the system score, the card score and the slot score of the slot the card is plugged in to.

Flow next proceeds to step 1370 where an Eeh_penalty is assessed for each plugged card that card does not support EEH where the PHB that the card is plugged beneath has more than one partition assigned to it. The penalty is applied to the system score, and to the applicable card and slot scores. If a system does not support EEH at all, then the penalty does not make sense to be assessed. Process-wise it can be presumed in this case that the Eeh_penalty value is set to 0 in such systems.

Step 1380 ends the process.

Overall the example embodiment system score can be summarized as follows:

system_score=For Each PHB with >1 part.

Phb_penalty*Number of Parts. under it

+

For Each planar with >1 partition under it Planar_penalty*Number parts under it.

it.

+

Unplugged_penalty for Each card not plugged.

+Twin_phb_penalty for each TWIN found under same PHB

+Twin_planar_penalty for each TWIN found under the same planar

+Daughter_penalty for each daughter not with mother under PHB

+Eeh_penalty for each non-eeh card sharing multi-partitions

It should be noted that this scoring process can be used independently of the placement and optimization aspects of the overall process to evaluate given configurations.

Optimization Sub-Processes

Within the optimization process for a fixed set of I/O drawers, there may be many passes of the Optimization Pass Process (FS_OP). This process attempts to optimize a configuration presuming there has been an effort to place all cards in to some slots. The process in a basic sense attempts to take cards that have bad tier scores and plug them into to slots that would improve their tier scores. The process allows for unplugging one card to plug in another to improve the overall scoring. Because of this one pass through the process can leave unplugged cards that were plugged in a previous pass. That is why multiple passes of the process may be applied before optimization is complete and if not possible to fully optimize a configuration, the process could continue forever unless arbitrarily terminated when it becomes apparent that the process is not further improving an optimization score.

Figure 14:
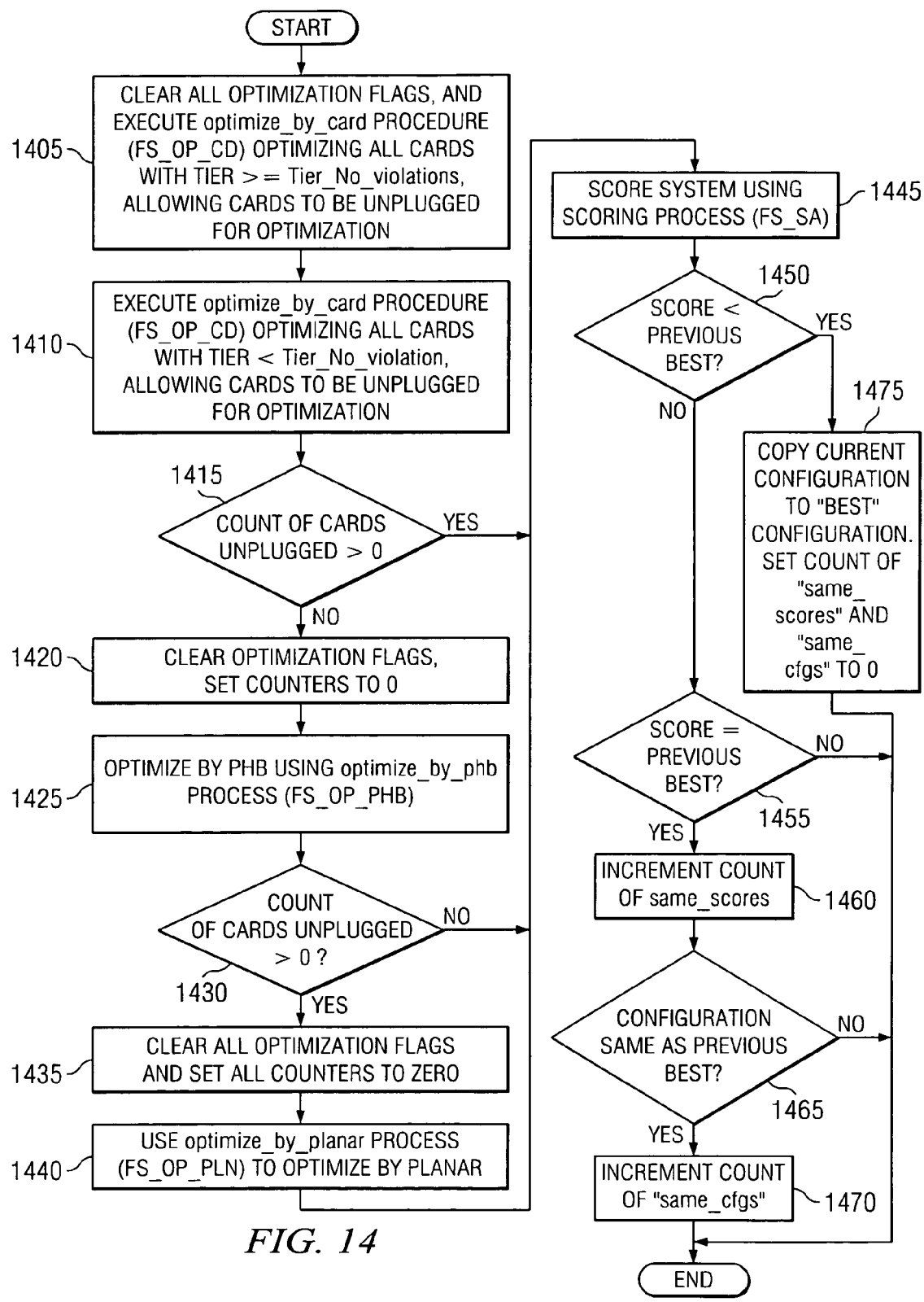
FIG. 14 shows an optimization pass algorithm consistent with a preferred embodiment.

In general, the process first attempts to optimize at an individual card level, then if successful at a PHD level, and if successful there, at a planar level. FIG. 14 gives the main process for an optimizing pass.

Step 1405 begins the process by clearing all optimization flags defined later in the process and executing the optimize_by_card sub-process (FS_OP_CD) to optimize all cards whose card tier (as computed by the tier scoring process) is as bad as or worse than Tier_No_violations. Unplugging of cards by the process is allowed.

When optimization is completed for these cards, by step 1410, the process attempts the same process to optimize all cards with tiers better than Tier_No_violations. Unplugging of cards by the process is allowed.

Flow then proceeds to step 1415 which checks the cnt of cards unplugged after the optimizations given. If equal greater than 0, then the optimization pass is complete and flow passes on to step 1445 to score the system after optimization.

If the cnt of unplugged cards is equal to 0, then the pass attempts a deeper optimization beginning with step 1420 where all optimization flags and counters are set to 0. Then flow goes on to step 1425 where the optimize_by_phb (FS_OP_PHB) process is executed.

From step 1425, step 1430 checks the cnt of cards unplugged after the optimizations given. If equal greater than 0, then the optimization pass is complete and flow passes on to block FS_OP_190 to score the system after optimization.

If all cards remained plugged, however, the process now attempts to optimize by planar by step 1435 which clears optimization flags and counters and step 1440 which executes the optimize_by_planar (FS_OP_PLN) routine.

After that optimization flow continues with step 1445.

In step 1445 the optimizing in the pass is complete and the system is scored using the Scoring process (FS_SA) to determine how optimized the system is. Step 1450 checks whether the score for the newly optimized configuration is better than the previous best configuration scored. If the answer is yes, flow continues moves to step 1475 where the current configuration is stored as the new best configuration and its score is recorded as the new best score. The cnt of same_scores and same_cfgs are set to 0. This terminates the process.

If the answer to step 1450 is no, the present configuration is not better than the best previous encountered, then flow proceeds to step 1455 to see if the score equals the best previous. If not the process terminates. If so, then by step 1460 the count of the number of iterations with the same_score is incremented and flow proceeds to step 1465.

Step 1465 asks if the current configuration is exactly the same as the previous best. If not, the process terminates. If so, the cnt of the number of configurations encountered that are the same (same_cfgs) is incremented and the process then terminates.

The "same_cfgs" and "same_scores" counters are used by the calling process to help determine when to stop requesting optimization loops when a given configuration can not be fully optimized.

Figure 15:
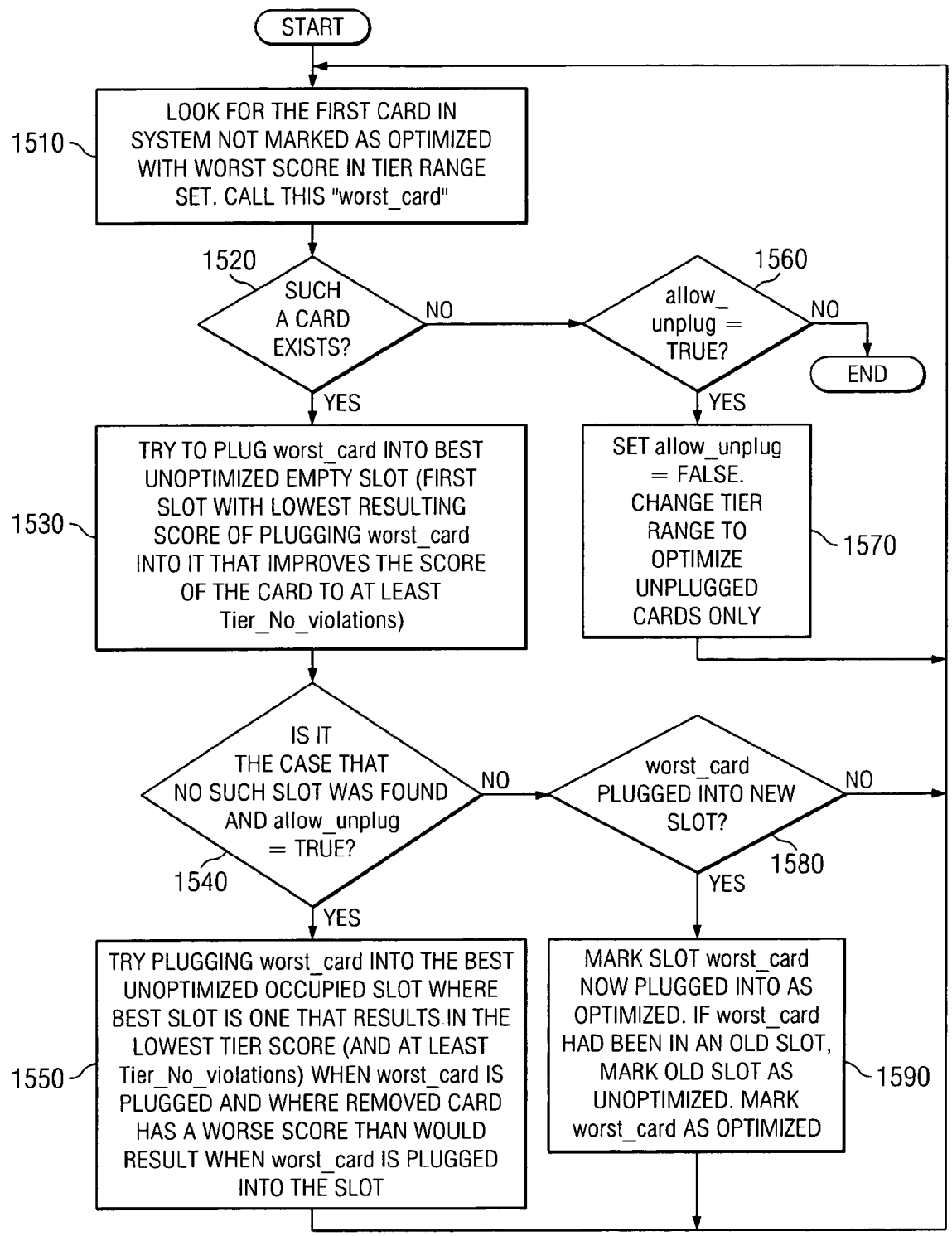
FIG. 15 shows an optimization by card algorithm consistent with a preferred embodiment.

Sub-processes used by the optimizing pass process are described next. The process for optimizing by card (FS_O_CD) is illustrated in FIG. 15. This process is part of the Optimizing Pass Process (FS_OP). It optimizes placements of individual cards in a configuration.

The process which calls this process explicates a initial tier range to work with and that the allow_unplug flag set to TRUE. It also presumes a set of cards as being marked as "unoptimized" and available for the process to work with and that a set of slots in the system are also so marked.

The process loops through all the unoptimized cards in the system twice. The first time it attempts to optimize all the cards in the initial tier range specified. Optimizing a card means plugging it in to a slot that provides a better tier score for the card when plugged then the card currently has. In plugging a card into a slot it is possible that this process will displace a card already in the slot. This is why once the initial pass through the cards is completed, the process then attempts to optimize all cards that were unplugged by placing them in empty slots.

With the initial conditions set, the routine begins with step 1510 where the first card in the system not yet optimized and in the given tier range is located. Flow proceeds to step 1520 where the question is asked if such a card were located. If not, flow moves on to step 1560. If so, flow continues with step 1530.

In step 1530 the process attempts to find the best unoptimized empty slot. This would be the first slot with the lowest resulting score that would be obtained by plugging the card into it that improves the score of the card. The score must at least improve to Tier_No_violations. FS_TS tier scoring process is used in evaluating the tier scores.

From step 1530, flows continues with step 1540. In that block the question is asked if were both the case that the card could not be plugged into a slot and the allow_plug flag were TRUE. If so, flow proceeds to step 1550. If not, flow would move to step 1580.

Step 1550 from step 1540 attempts to find a target slot for the card by looking at slots already occupied. If such a slot is used, the current contents of the slot would be unplugged and the new card to be plugged into the slot. The slot found by step 1550, if any, is the first encountered that best improves the score of the target card (to at least Tier_No_violations) and where the card removed has a worst score than the score resulting by plugging worst_card. From step 1550, flow returns to the start of the process to attempt to optimize another card.

Step 1580 comes from step 1540. It is executed when a card worst_card was found and plugged into a new slot or no worst_card was found and allow_unplug=FALSE. If it were the latter case, by the block determining that worst_card was not found and plugged into a new slot, the process ends. On the other hand, if the worst_card had been found and plugged into a new slot, flow continues with step 1590.

In step 1590, the slot that the worst_card was plugged into gets marked as being optimized. If the worst_card had been removed from an old slot to plug into the new slot, the old slot gets marked as unoptimized. Also the worst_card is marked as optimized. Flow then returns to the beginning of the process to attempt to locate and optimize another card.

Step 1560 comes from step 1520 when a worst_card can not be located. In the block, the flag allow_unplug=TRUE is checked. If the flag is FALSE, then the process finishes as having optimized all cards possible. If the flag is TRUE, then by step 1570, the flag is set to FALSE and the tier range is set to look for Tier_Unplugged only. This changes the process to only look to optimize cards currently unplugged. This pass through the process is primarily meant to pick up any cards unplugged by earlier iterations. From step 1570 flow is returned to the beginning of the process. It should be noted that because the cards being optimized have a tier score of Tier_unplugged, candidate slots for these cards must be empty. In other words, the process won't unplug a card to plug these into cards into slots.

The intent of the "Optimize by PHB" process is to take PHBs with cards from multiple partitions and make them contain just one if possible. Part of that is accomplished by taking PHBs with more than one partition and moving out cards from the partition(s) with the least number of cards in them. The cards would have to go into PHBs already containing nothing but cards from that partition. The process also attempts to take PHBs with just one card and free up the PHB if possible by migrating the card into another PHB composed of nothing but cards from that partition.

Figure 16:
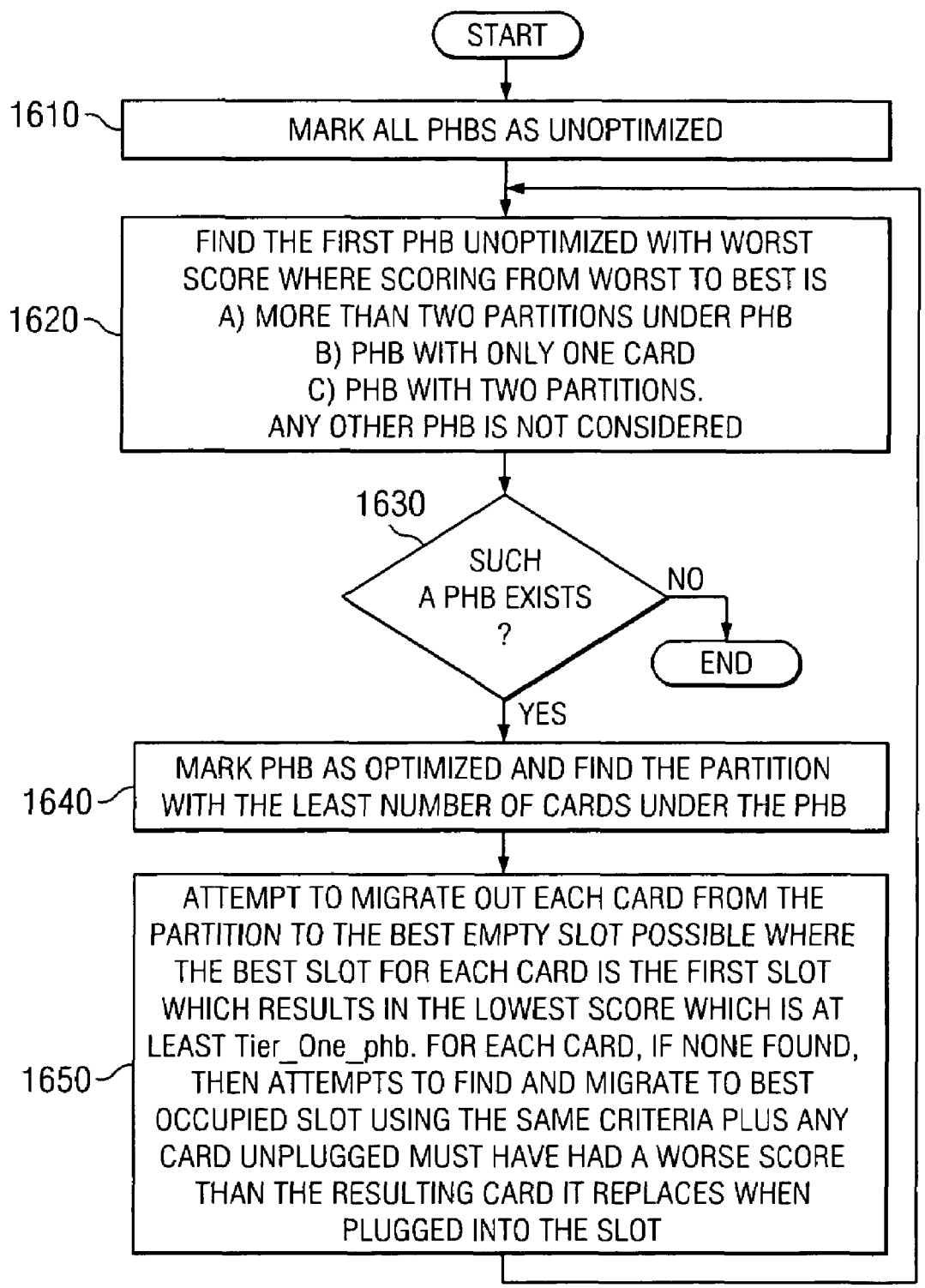
FIG. 16 shows an optimization by processor host bridge algorithm consistent with a preferred embodiment.

FIG. 16 shows the detailed process for optimizing by PHB. The process begins with block step 1610 where all the PHBs are marked as not having yet been optimized.

Flow then proceeds to block step 1620 where the first unoptimized PHB is found that has the worst score where scoring is defined, from worst to least as a) having more than 2 partitions under a PHB, b) Having just 1 card c) having 2 partitions. If none of the preceding apply, the PHB is ignored.

From step 1620 flow continues with step 1630 were it is seen if such a PHB were found. If not, then the process ends. If so, flow continues with step 1640 where the PHB is marked as optimized and the partition with the least number of cards under the PHB is located.

From step 1640, step 1650 attempts to migrate out each card from the partition found in the previous step to the best empty slot in a different PHB where the best slot is defined as the one with the lowest resulting tier score which is at least Tier_One_phb insuring that there will continue to be just one partition under the PHB the card is being plugged in to. If none can be found, then tries to find the best occupied slot that fits the same criteria and where the card that has to be removed to plug in the new card has a score that is worse than the card that would be plugged into the slot. If such a slot can be found, the card is plugged into the slot and the other card is removed.

Figure 17:
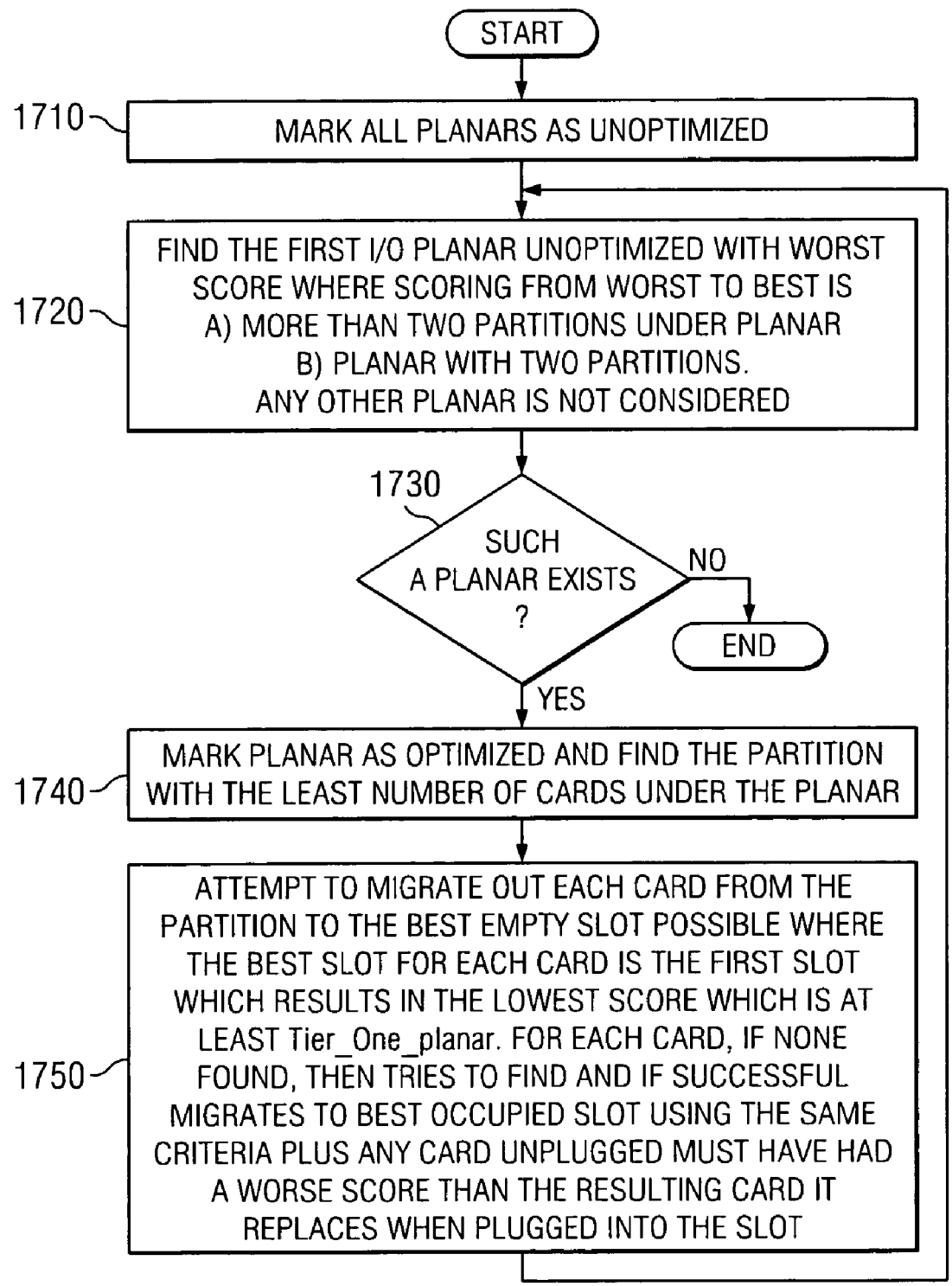
FIG. 17 shows an optimization by planar algorithm consistent with a preferred embodiment.

Optimize by planar is almost exactly the same as optimize by PHB except there is no attempt to find and single out planars having just one card as this is so unlikely at this point to change the optimization. FIG. 17 illustrates this process.

The process begins with step 1710 where all the I/O planars are marked as not having yet been optimized.

Flow then proceeds to block step 1720 where the first unoptimized planar is found that has the worst score where scoring is defined, from worst to least as a) having more than 2 partitions under a PHB, b) having 2 partitions. If neither applies, the planar is ignored.

From step 1720 flow continues with step 1730 were it is seen if such a planar were found. If not, then the process ends. If so, flow continues with step 1740 where the planar is marked as optimized and the partition with the least number of cards under the planar is located.

From step 1740, step 1750 attempts to migrate out each card from the partition found in the previous step to the best empty slot in a different planar where the best slot is defined as the one with the lowest resulting tier score which is at least Tier_One_planar insuring that there will continue to be just one partition under the planar the card is being plugged in to. If none can be found, then tries to find the best occupied slot that fits the same criteria and where the card that has to be removed to plug in the new card has a score that is worse than the card that would be plugged into the slot. If such a slot can be found, the card is plugged into the slot and the other card is removed.

Improving on the state of the art, the disclosed method provides a means of a) analyzing and b) optimizing the placement of PCI cards in a system to take into account performance, function and availability for a fixed set of I/O drawers and c) minimizing the number of I/O drawers required to achieve the desired availability level.

The process is applicable in a number of areas:

a) It can look at existing system configurations and evaluate the performance, function and availability characteristics b) It can be used when a system is first being designed to determine the best placement of cards and how many I/O drawers would be required. c) It Can also be used during the process of assembling a system in a manufacturing environment and d) It can evaluate and optimize configuration changes in an existing system such as adding an I/O card or changing partitioning. This can be done independently from the optimization and placement processes using the FS_SA system scoring process disclosed.

The disclosed process itself is detailed enough to account for redundant cards under a partition, directed placement of certain adapters into slots, EEH support for a subset of cards in a system, blank slots desired for future expansion, and single card functions being spread across more than one physical adapters.

Definitions

Following is a glossary of terms and abbreviations used in this disclosure.

LPAR

Logical Partitioning or logical partition. pSeries systems have a means of dividing up hardware into what are termed logical partitions, or just partition. Each partition runs it own operating system image. Each partition may also have exclusive use of a certain subset of the hardware of a system (memory, processors, I/O adapters, etc.)

LPAR Partition or Partition

One partition using an LPAR scheme.

PCI

Peripheral Component Interconnect, a standard for connecting I/O adapters to a system. There are different levels and variations of the PCI standard, but for this document, the information provided is broadly applicable to these various levels and variations (for example PCI versus PCI-X) and the term PCI will be used to refer to all of them.

PCI Bus

An I/O bus that conforms to a PCI standard. The word bus is used even though the implementations here generally presume there is only one I/O adapter connected to a PCI bus.

PCI Adapter

An informal term for an I/O adapter connected to a host through a PCI bus. A PCI adapter is generally considered to be a self contained unit which connects to a system through a PCI adapter slot. The logic may, however, be integrated in a larger system component. The adapter can also be defined as an "IOA" in PCI terms.

PCI Card

Another informal term for a PCI Adapter. For simplicities sake in the rest of this disclosure, the terms "I/O card", "PCI card" or "card" will be preferred and will refer to a "PCI adapter" as defined above PCI Adapter Slot (or PCI Slot) or I/O Slot A physical connection where a PCI card can be plugged into a system connecting it to a PCI Bus. A PCI card may be physically be pluggable into a PCI slot and thus connected to a PCI bus. The card function, however, may be integrated into a larger system component without the use of a physical slot. However, this disclosure will adopt the fiction that every PCI card may physically be plugged into or unplugged out of a PCI Slot.

I/O Planar

The concept of a logical function containing a number of logical and physical PCI Slots and the means of being connected to a processor complex. Physical PCI cards can be plugged into the physical slots. Logical PCI card functions may also be integrated into the I/O planar. In larger system implementations, an I/O planar will be separate from the processor complex. In simpler systems both functions may actually be integrated into one physical logic card.

PHB

Processor Host Bridge. This is a logical function that connects a PCI Bus to a processor complex using whatever is the native system bus used for processors. There may actually be other intermediate connections (such as an I/O hub) between physical processors and the PHB, but from a PCI standpoint a PCI bus is connected to processors through a PHB.

PCI-PCI Bridge (Sometimes just PCI bridge) Logic in a system that connects PCI busses to other PCI busses. A common implementation used here is sometimes known as an EADS chip. It is capable of connecting several PCI busses each containing one PCI slot, through another PCI bus to a PHB. From a hierarchical point of view, a CEC may talk to a PHB to a PCI-PCI bridge to a PCI adapter.

RIO I/O Interface (or RIO Bus)

A high speed serial interface generally used to connect a processor complex to I/O planars.

RIO Port

Logic that is used to create a RIO bus. Two RIO ports are connected together to create a RIO bus.

RIO Hub

Logic that is used to connect a processor complex or PHBs to each other across a RIO Bus using RIO ports. Typically a RIO Hub contains two RIO ports allowing a backup path in case the primary bus path has a hardware problem.

I/O RIO Hub (or I/O Hub)

A RIO hub that talks at one end to a processor complex through RIO ports and at the other end to one or more PHBs connected to I/O. A typical pSeries implementation provides two RIO ports for a RIO Hub and each RIO Hub can communicate with one, two or three PHBs.

I/O Drawer

A physical unit which contains one or more I/O planars and associated power and cooling. Large pSeries systems may contain multiple I/O drawers. In the smallest systems the logical I/O drawer function is integrated into the complex that contains the Processor complex.

Processor Complex

A vague term used to represent the logic comprising one or more processors, main memory, a RIO bus interface capable of connecting I/O through I/O hubs, and all the associated logic including clocking, caches, power and cooling.

Feature Code

A number used to uniquely identify an I/O adapter type within a system. Two adapters with the same feature code are considered to be functionally identical.

Plugging Rule

Some restriction on what card can be placed in what slot or what slot can contain what kind of card or how many of a certain set of feature codes can exist under a partition, phb, planar, I/O drawer or system. Some of these restrictions come about due to performance considerations. Others are more functional in nature (e.g. a given card won't work in a given slot.)

EEH

Enhanced error handling. A patented method of allowing device drivers to recover from PCI faults such as parity errors that would otherwise be uncorrectable. As applied here, this entails using a PCI-PCI bridge between the PHB and the I/O adapter which is capable of "freezing" on parity errors by rejecting future I/O operations and returning a set value of all 1's on any MMIO read operation. This function prevents partitions from crashing whenever such a parity error occurs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of placing multiple I/O adapters in a partitioned system, comprising the steps of:
    describing performance rules for use of I/O adapters in the system;
    describing availability rules for use of I/O adapters in the system;
    scoring system configuration according to how well it conforms to the defined performance and availability rules; and
    wherein the step of scoring includes calculating a system score, calculating a slot score for each I/O adapter slot, and calculating an adapter score for each one of the I/O adapters.

2. The method of claim 1, further comprising the steps of: describing compatibility rules for I/O adapters and slots.

3. The method of claim 1, wherein the specific I/O adapters to be placed in the system are enumerated.

4. The method of claim 3, wherein the specific partition each adapter is to be incorporated into is enumerated.

5. The method of claim 1, wherein the performance and availability rules tend to maximize system performance, maximize system availability, and minimize a number of drawers required in the system.

6. The method of claim 1, wherein the I/O adapter is a PCI adapter.

7. A method of placing multiple I/O adapters in a partitioned system, comprising the steps of:
    describing rules for placing I/O cards into I/O slots for a first number of I/O drawers;
    scoring a placement of the I/O cards into the I/O slots according to how well the placement conforms to the rules; and
    wherein the step of scoring includes calculating a system score, calculating a slot score for each slot, and calculating a card score for each card.

8. The method of claim 7, wherein the rules include performance rules and availability rules for placing I/O cards in the system, wherein the performance rules tend to maximize performance and the availability rules tend to maximize availability of I/O cards in the system.

9. The method of claim 7, wherein the I/O card is a PCI card.

10. The method of claim 7, further comprising the step of:
    given a list of possible I/O drawers that can be supported by the partitioned system, specifying a minimum number of I/O drawers needed to satisfy the rules.

11. A method of optimizing placement of I/O cards in a partitioned computer system, comprising to steps of:
    enumerating specific I/O cards to be included in the system;
    describing an initial placement of all the I/O cards in the system;
    describing a set of rules for optimizing placement of I/O cards in the system, wherein the rules maximize performance, maximize availability, and minimize the number of drawers of the system; and
    wherein the set of rules includes calculating a system score, calculating a slot score for each I/O card slot, and calculating a card score for each one of the I/O cards.

12. The method of claim 11, further comprising the step of enumerating the partitions into which each card is initially placed.

13. The method of claim 11, wherein the I/O card is a PCI card.

14. A method for optimizing I/O card configuration of a partitioned system, comprising the steps of:
    defining a first number of I/O drawers for the system;
    assessing a slot score, a card score, and a system score according to a set of rules;
    if the first number of I/O drawers is less than a max number of I/O drawers allowed, defining a second number of I/O drawers for the system; and
    assessing the slot score, the card score, and the system score according to the set of rules.

15. The method of claim 14, wherein the set of rules includes performance optimizing rules and availability optimizing rules for the system.

16. A computer readable and recordable media to store instructions for optimizing I/O adapter placement in a partitioned system, comprising the computer implemented steps of:
    first instruction for evaluating performance rules for use of I/O adapters in the system;
    second instructions for evaluating availability rules for use of I/O adapters in the system;
    third instructions for scoring system configuration according to how well it conforms to the defined performance and availability rules; and wherein the third instructions for scoring includes calculating a system score, calculating a slot score for each I/O system slot, and calculating an adapter card score for each one of the I/O adapters.

* * * * *